(12) United States Patent
Wendt et al.

(10) Patent No.: US 7,963,562 B2
(45) Date of Patent: Jun. 21, 2011

(54) SAFETY BELT SYSTEM FOR A MOTOR VEHICLE

(75) Inventors: Mario Wendt, Stahnsdorf (DE); Kliment Vidolov, Berlin (DE)

(73) Assignee: Takata-Petri AG, Aschaffenburg (DE)

( * ) Notice: Subject to any disclaimer, the term of this patent is extended or adjusted under 35 U.S.C. 154(b) by 0 days.

(21) Appl. No.: 12/458,985

(22) Filed: Jul. 29, 2009

(65) Prior Publication Data

US 2009/0289445 A1  Nov. 26, 2009

Related U.S. Application Data

(63) Continuation of application No. PCT/EP2008/051669, filed on Feb. 12, 2008.

(30) Foreign Application Priority Data

Feb. 12, 2007 (DE) .......................... 10 2007 007 702
Sep. 28, 2007 (DE) .......................... 10 2007 047 549

(51) Int. Cl.
 *B60R 22/38* (2006.01)
 *B60R 22/42* (2006.01)

(52) U.S. Cl. ........................................ 280/806; 280/808

(58) Field of Classification Search .................. 280/806, 280/808
See application file for complete search history.

(56) References Cited

U.S. PATENT DOCUMENTS

| | | | |
|---|---|---|---|
| 3,888,541 A * | 6/1975 | Stephenson | 297/479 |
| 3,898,715 A * | 8/1975 | Balder | 24/196 |
| 3,973,650 A | 8/1976 | Nagazumi | |
| 4,027,905 A | 6/1977 | Shimogawa et al. | |
| 4,291,918 A * | 9/1981 | Finn et al. | 297/483 |
| 4,876,770 A * | 10/1989 | Bougher | 24/170 |
| 5,058,244 A * | 10/1991 | Fernandez | 24/170 |
| 5,138,749 A * | 8/1992 | McCune et al. | 24/196 |
| 5,411,292 A * | 5/1995 | Collins et al. | 280/806 |
| 5,667,246 A | 9/1997 | Miller, III | |
| 5,806,148 A * | 9/1998 | McFalls et al. | 24/168 |

(Continued)

FOREIGN PATENT DOCUMENTS

DE  23 01 506 A1  8/1973

(Continued)

OTHER PUBLICATIONS

Chinese Examination report in Appln No. 200880001675.0 dated Jul. 5, 2010.

(Continued)

*Primary Examiner* — Paul N Dickson
*Assistant Examiner* — Nicole Verley
(74) *Attorney, Agent, or Firm* — Foley & Lardner LLP

(57) ABSTRACT

A safety belt system for a motor vehicle is provided. The safety belt system comprising a safety belt, a shoulder portion of the safety belt, a buckle element, a mobile region of the buckle element, which under the action of forces caused by a crash is mobile from an initial position in which the safety belt may slide along the buckle element into a final position, in which the safety belt is fixed to the buckle element. The safety belt cooperating with the mobile region, such that the mobile region is movable by a force acting on the shoulder portion which tensions the shoulder portion in the direction of extension of the belt, from its initial position into its final position. The fixing of the safety belt on the buckle element is carried out by the mobile region itself.

18 Claims, 15 Drawing Sheets

U.S. PATENT DOCUMENTS

| | | | |
|---|---|---|---|
| 5,870,816 A * | 2/1999 | McFalls et al. | 29/434 |
| 6,708,380 B2 * | 3/2004 | Schneider et al. | 24/633 |
| 7,325,280 B2 * | 2/2008 | Ichida | 24/170 |
| 7,712,194 B2 * | 5/2010 | Fyhr | 24/171 |
| 2002/0067035 A1 * | 6/2002 | Ritters et al. | 280/807 |
| 2009/0025193 A1 * | 1/2009 | Fyhr | 24/593.1 |

FOREIGN PATENT DOCUMENTS

| | | |
|---|---|---|
| DE | 24 60 163 A1 | 6/1976 |
| DE | 27 41 297 A1 | 3/1979 |
| DE | 31 16 910 A1 | 11/1982 |
| DE | 32 33 797 C1 | 6/1983 |
| DE | 37 15 861 A1 | 12/1988 |
| DE | 38 29 982 A1 | 3/1989 |
| DE | 42 32 160 A1 | 3/1994 |
| DE | 43 07 089 C2 | 11/1995 |
| DE | 198 32 467 A1 | 1/2000 |
| DE | 198 32 467 A1 | 1/2000 |
| DE | 199 15 275 A1 | 10/2000 |
| DE | 203 03 549 UI | 6/2003 |
| DE | 102 10 781 A1 | 10/2003 |
| DE | 10 2004 061 709 A1 | 7/2006 |
| GB | 2 349 615 A | 11/2000 |
| GB | 2 356 604 A | 5/2001 |
| JP | 8-40195 A | 2/1996 |
| JP | 2001-047967 A | 2/2001 |
| JP | 2007-186167 A | 7/2007 |
| JP | 2007-186168 A | 7/2007 |
| KR | 100150310 B1 | 6/1998 |
| KR | 100166178 B1 | 9/1998 |
| WO | WO 2004/076248 A1 | 9/2004 |
| WO | WO 2006/072313 A1 | 7/2006 |
| WO | WO 2006/092206 A1 | 9/2006 |
| WO | WO 2007/090551 A1 | 8/2007 |

OTHER PUBLICATIONS

Russian Decision in Appln No. 2009132637/11, dated Dec. 2, 2008.

\* cited by examiner

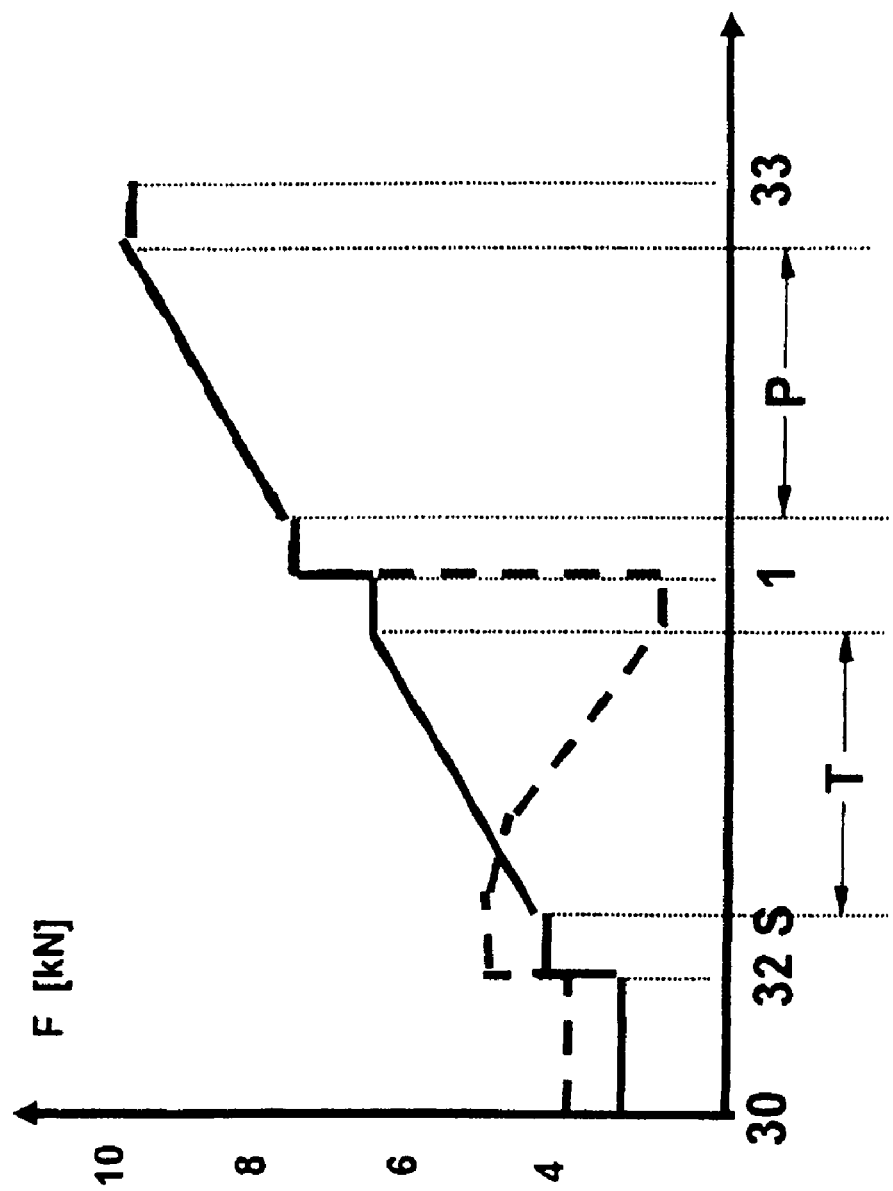

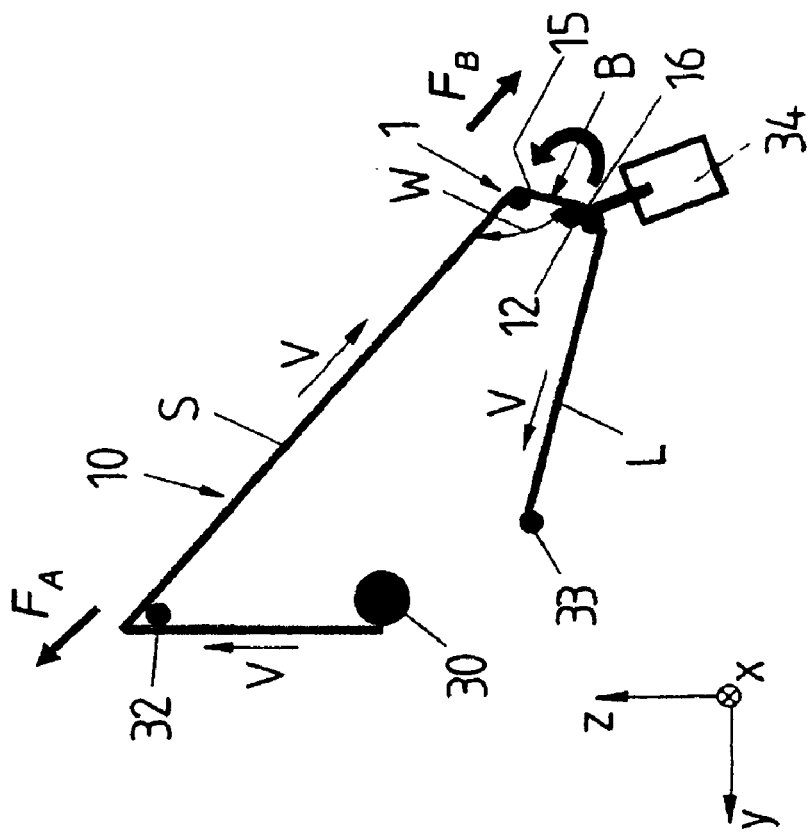
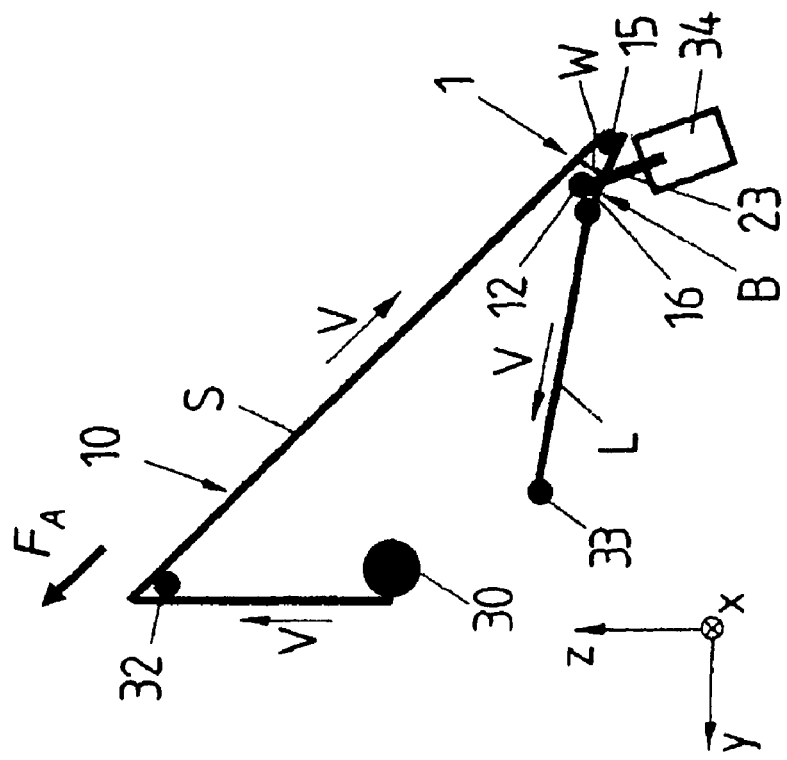

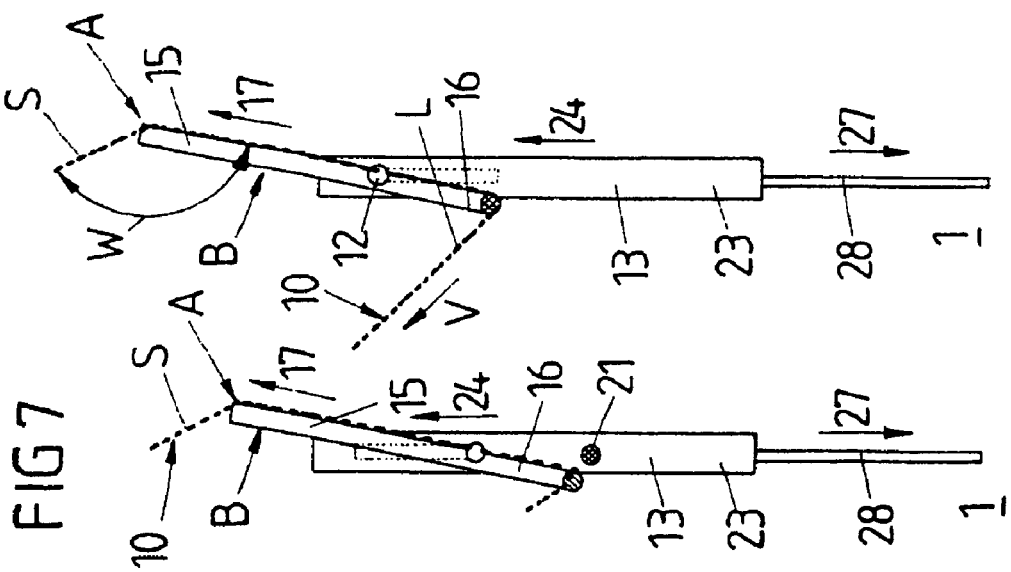

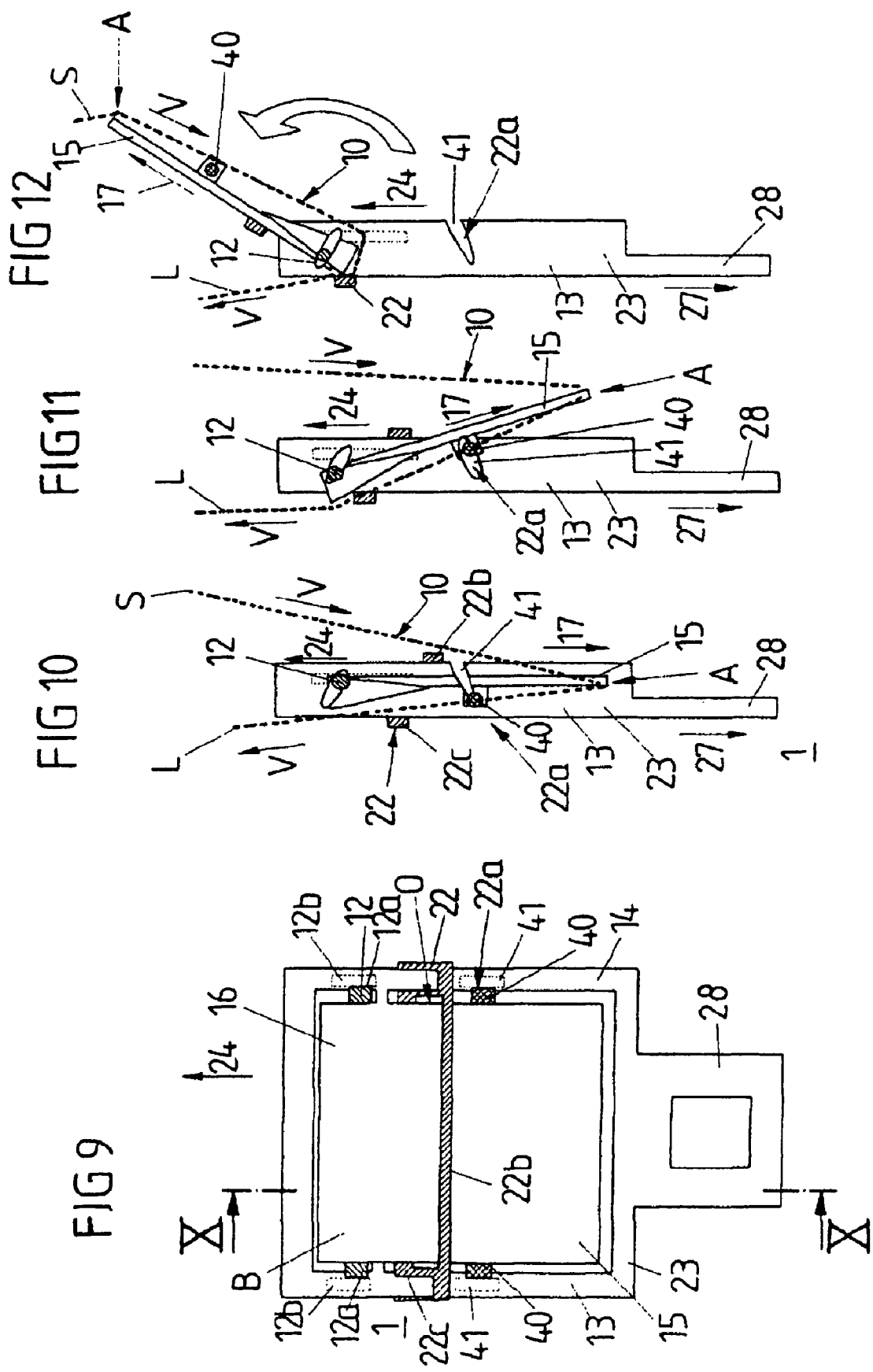

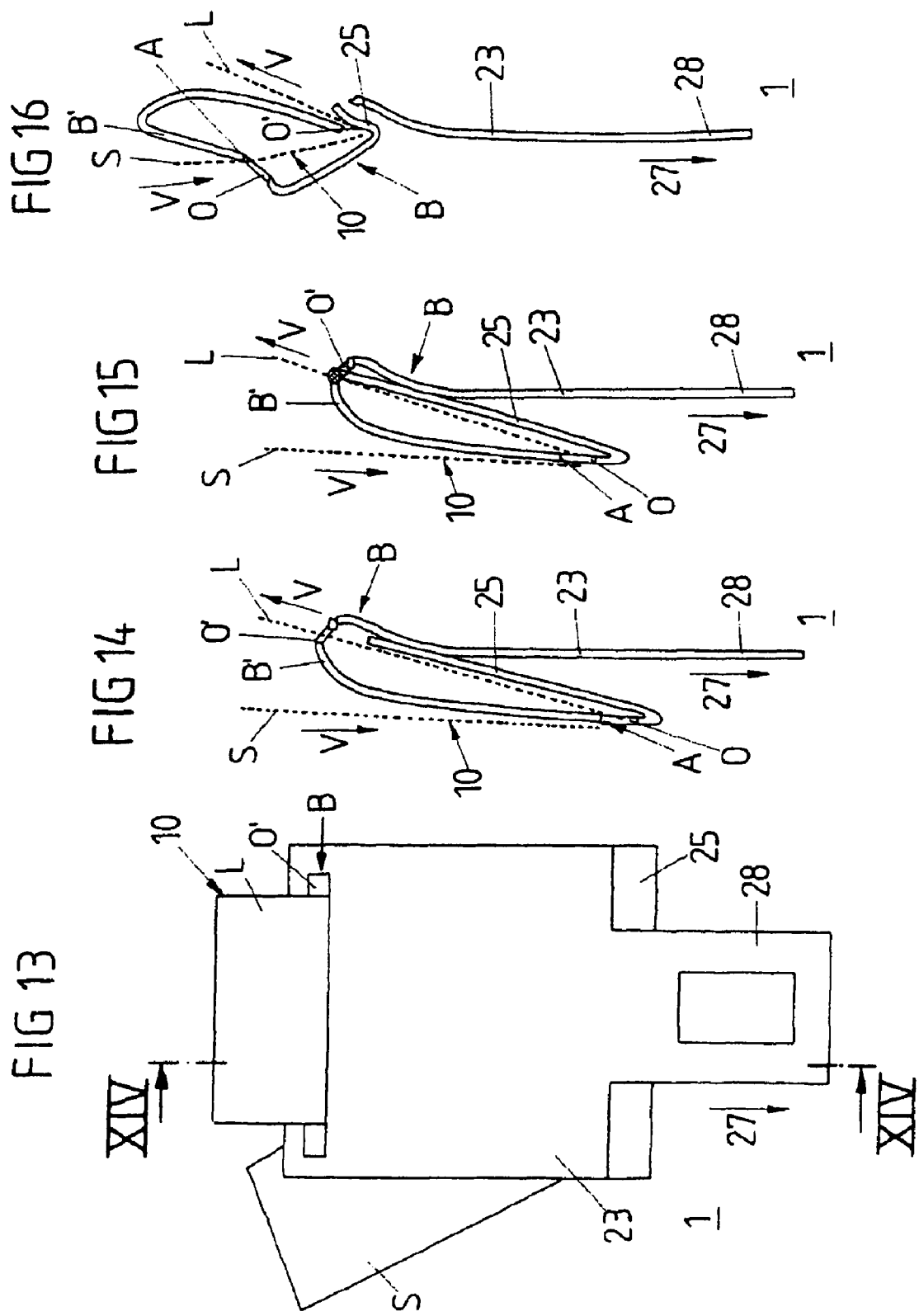

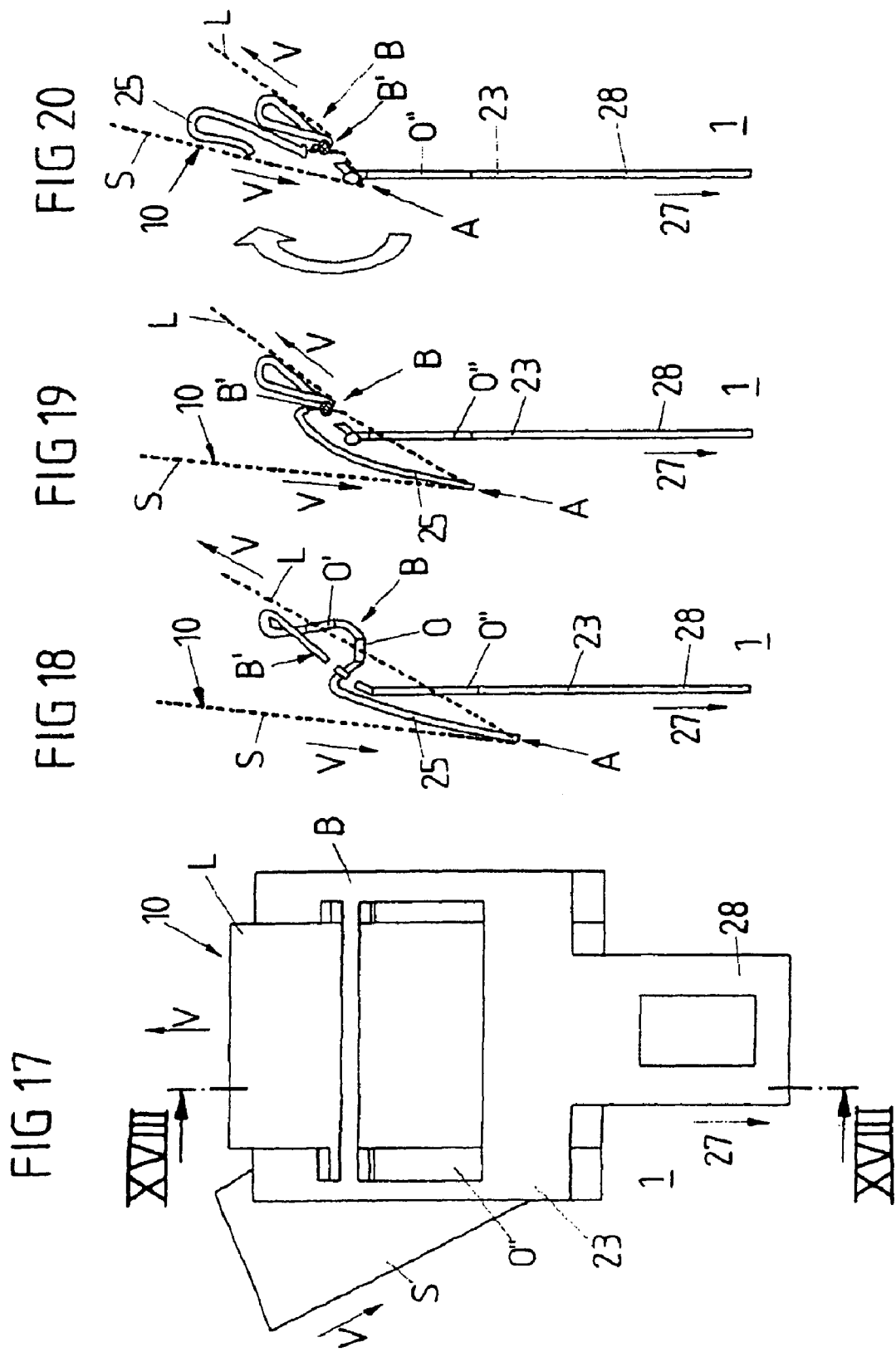

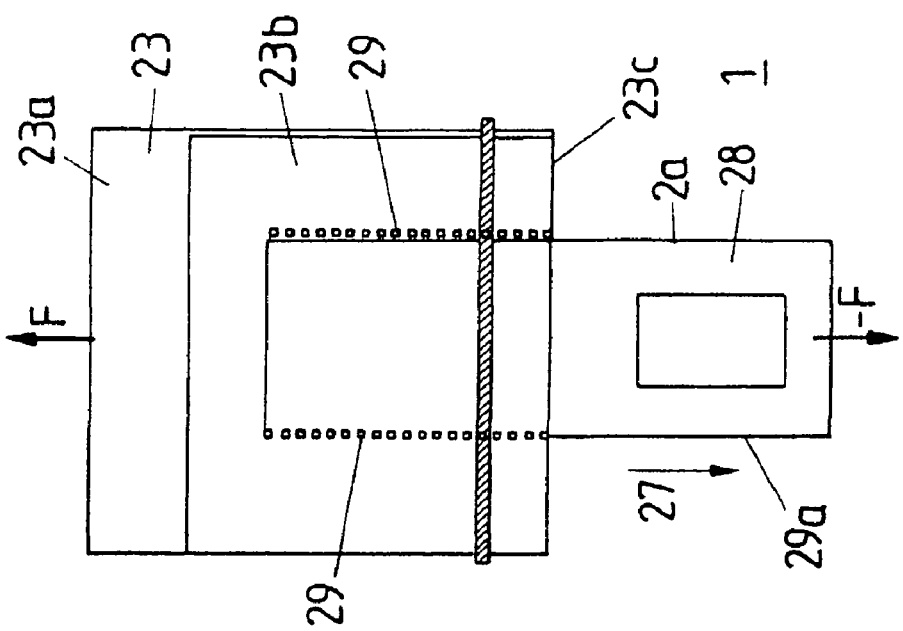
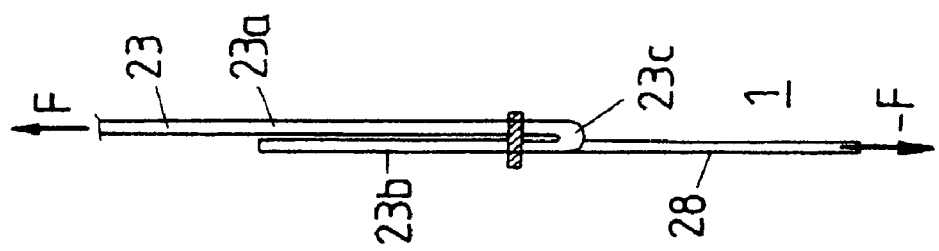
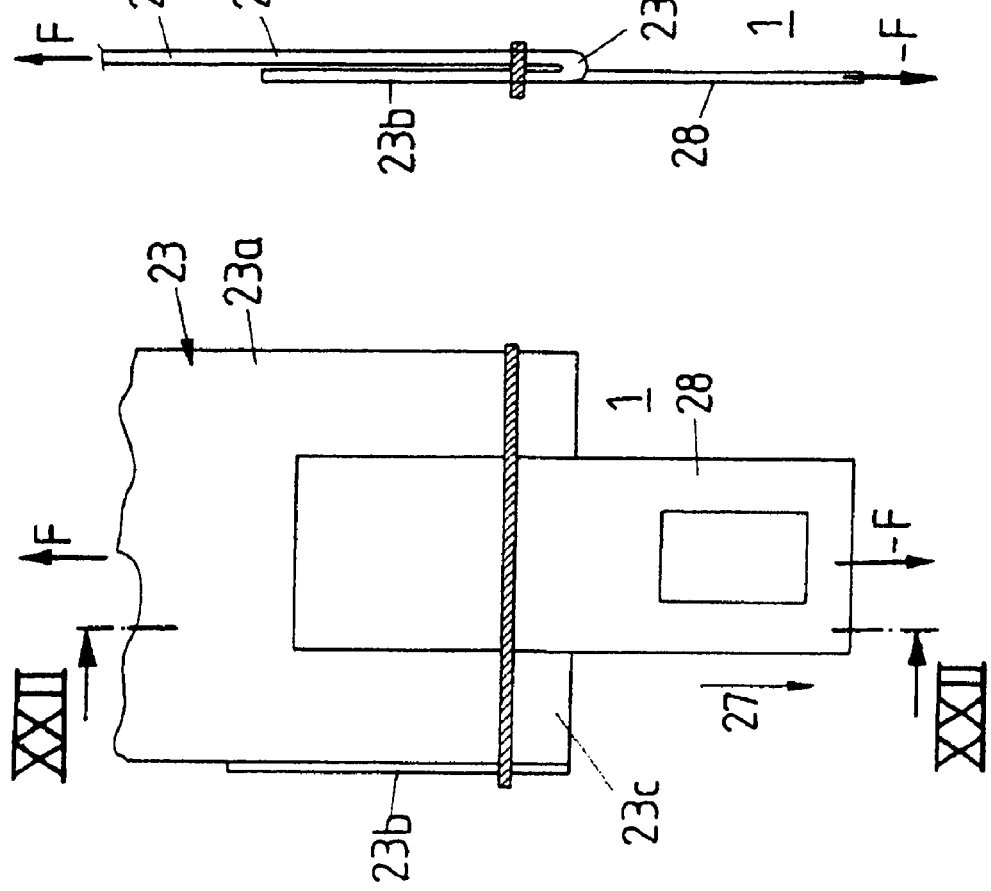

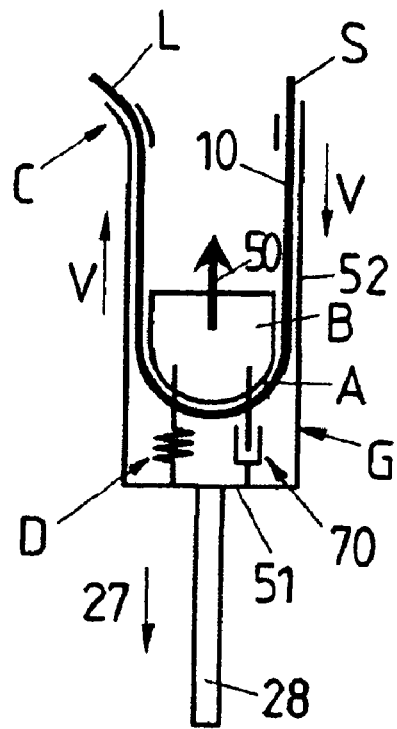
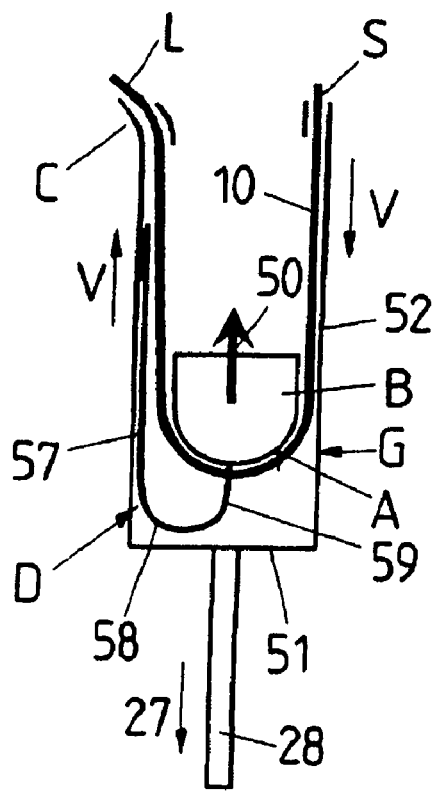

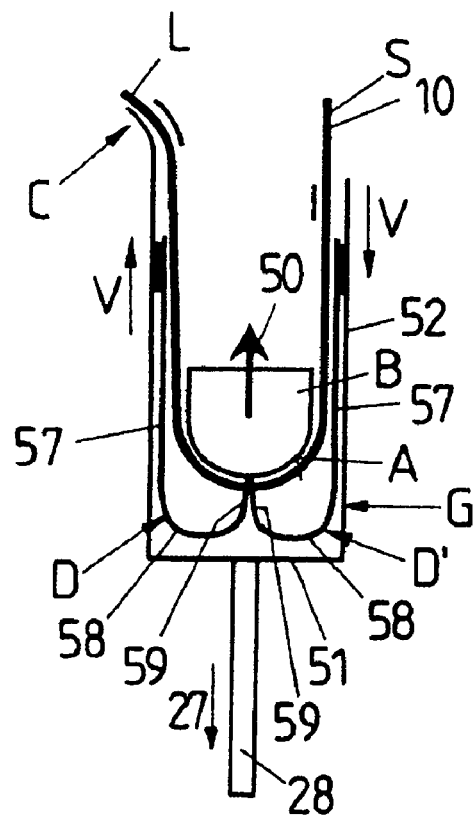
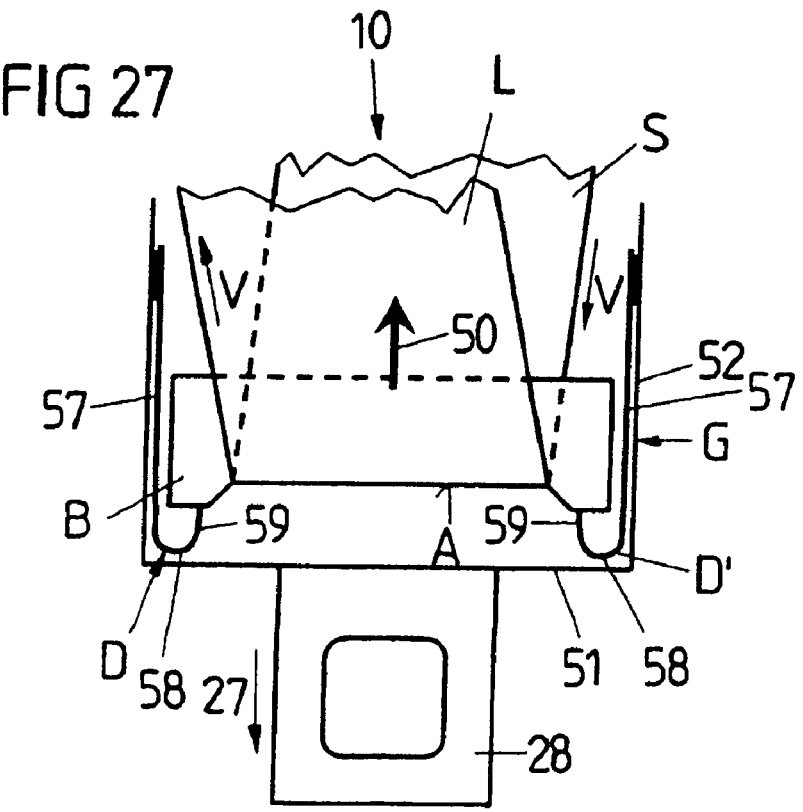

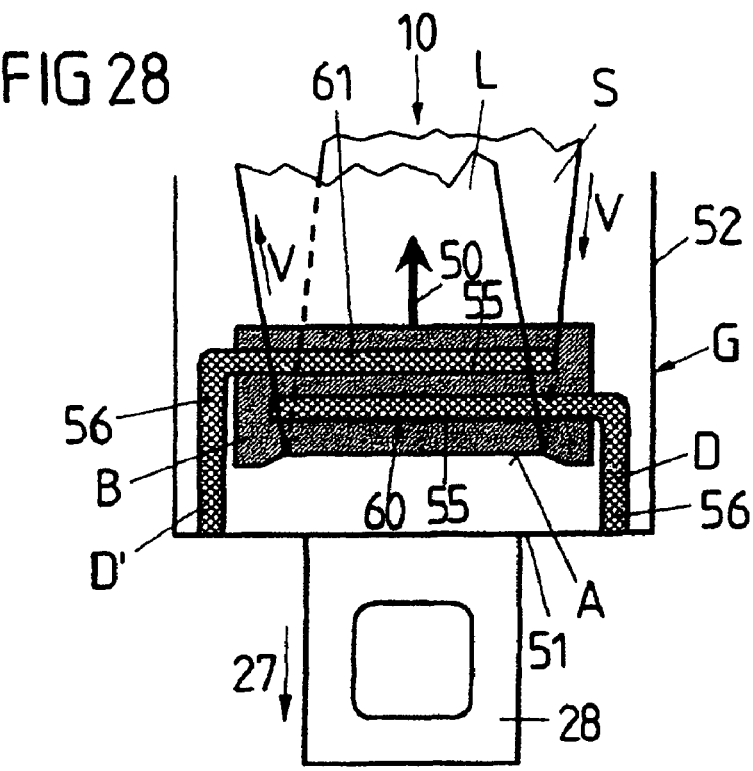
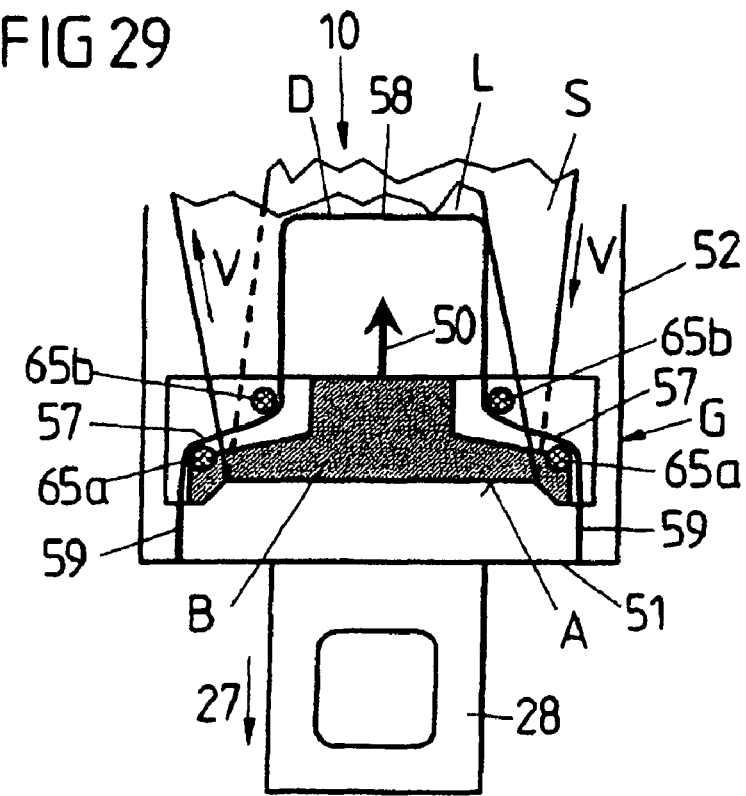

SAFETY BELT SYSTEM FOR A MOTOR VEHICLE

CROSS-REFERENCE TO RELATED PATENT APPLICATIONS

This application is a Continuation of International Application PCT/EP2008/51669, filed Feb. 12, 2008, which claims priority to German Utility Model Application 10 2007 007 702.7, filed Feb. 12, 2007, and German Utility Model Application 10 2007 047 549.9, filed Sep. 28, 2007. All of the foregoing applications are incorporated herein by reference in their entireties.

BACKGROUND

The application relates to a safety belt system for a motor vehicle.

A safety belt system is known from DE 4 232 160 (incorporated by reference herein), comprising a safety belt extending in a direction of extension of the belt, a buckle element arranged in the region of a buckle for deflecting the safety belt in the direction of extension of the belt, the buckle element subdividing the safety belt into a shoulder portion (shoulder belt) extending diagonally over the upper body of a person and a further belt portion connected to the shoulder portion which, in particular in the form of a lap portion (lap belt), extends over the lap of said person strapped-in according to requirements by means of the safety belt, as well as a mobile region of the buckle element which in the event of a dangerous situation (in the event of a crash) may be moved from an initial position in which the safety belt may slide along on the mobile region into a final position in which the safety belt is secured to the buckle element.

In the present application, the phrase "securing the safety belt to the buckle element" is understood as the fixing of the safety belt to the buckle element such that the safety belt may no longer slide along the buckle element and/or only by applying considerably greater, predeterminable forces.

In this application, "direction of extension of the belt" is understood as the direction which the safety belt follows along its entire path, i.e. the direction of extension of the belt alters its orientation three-dimensionally when the safety belt is deflected, for example, by the buckle element.

A drawback with the aforementioned safety belt system is that, in the event of restraint, the force introduced via the safety belt to a vehicle passenger increases in the direction of extension of the belt. Thus with a shoulder portion (shoulder belt) which extends in the direction of extension of the belt from a shoulder belt deflection element diagonally over the upper body of the passenger to the buckle element, the force which acts in the direction of extension of the belt increases and as a result the force introduced into the upper body of the vehicle passenger increases, proceeding from the shoulder of the passenger in the direction of extension of the belt to the chest of the passenger, and namely as a result of the friction between the passenger and the shoulder belt. Consequently, greater forces are applied in the chest region of the vehicle passenger which is susceptible to injury, than on the shoulder region of the vehicle passenger which is relatively less susceptible to injury.

A safety belt system is known from WO 2006/092206 A1 (incorporated by reference herein) in which, moreover, the mobile region is configured by a force acting on the shoulder portion which tensions the shoulder portion in the direction of extension of the belt, to be displaced from its initial position into its final position, the mobile region relieving the shoulder portion when moving into its final position such that the force acting in the direction of extension of the belt of the shoulder portion and thus the resulting force acting on the shoulder portion is limited. In this connection, the mobile region in the form of a first slide for fixing the safety belt to the buckle element drives a separate clamping element in the form of a second slide which clamps the safety belt to the buckle element before the first slide has reached its final position.

SUMMARY

An object of the invention is to improve further a safety belt system of the aforementioned type.

According to an exemplary embodiment, the mobile region is designed and provided to secure the safety belt on the buckle element and namely, in particular, by the mobile region coming into contact with the safety belt. In this case, the safety belt may be secured, for example, by a frictional connection with the buckle element.

Exemplary, the mobile region is designed and provided to come into contact in its final position, or even before reaching its final position, with a portion of a safety belt via a contact surface of the mobile region and with said contact surface to press the aforementioned portion of the safety belt against the buckle element, in order to secure the safety belt by clamping on the buckle element.

As a result of the present force limitation on the buckle element, in the event of restraint, the forces which are introduced via the shoulder belt into the chest region of a vehicle passenger are reduced relative to those forces which are introduced via the safety belt into the shoulder region of the passenger, so that in contrast to a safety belt system with a conventional buckle element, the forces introduced into the passenger are greater in the region of the shoulder of the passenger than in the chest region of the vehicle passenger. The force limitation on the buckle element thus ensures a redistribution of the usual force path to a force-limited belt portion (for example shoulder portion).

Additionally, forces acting on the shoulder of a vehicle passenger are more effective with regard to the restraint of the vehicle passenger than comparable forces acting on the chest region of the passenger, as the effective lever arm, where restraining forces act on the shoulder, is formed by the entire upper body of the vehicle passenger and is thus longer than the effective lever arm of the restraining forces acting on the chest region of the vehicle passenger.

Exemplary, the mobile region is configured in one piece, so that it comprises no parts which are mobile relative to one another—in particular forcibly controlled. The securing of the safety belt takes place, therefore, in a simple, reliable manner and involves no complex cooperation of a plurality of parts which are mobile relative to one another.

It is further exemplary provided that, for fixing the safety belt to the buckle element, the mobile region exerts a force on the safety belt in a direction which faces the final position of the mobile region, so that a force deflection may be dispensed with.

Exemplary, the mobile region of the buckle element has a bearing region against which the safety belt in the initial position of the mobile region bears under pretension. This pretension may, for example, be provided by a belt retractor which tightens the safety belt in the direction of extension of the belt or by the passenger himself/herself, which as a result of a deceleration of the motor vehicle is forced along the vehicle longitudinal axis against the safety belt which is in position and therefore tensions said safety belt in the direction of extension of the belt.

The bearing region of the mobile region is used, on the one hand, for deflecting the safety belt, by said safety belt being positioned in the form of a loop around the bearing region and, on the other hand, for introducing force into the mobile region and namely via the safety belt bearing against the bearing region, so that the mobile region in the event of restraint may be moved from its initial position into its final position.

For limiting a force introduced into the shoulder portion the mobile region is designed and provided to displace the bearing region during the movement into the final position counter to the direction of extension of the belt of the shoulder portion such that the shoulder portion bearing against the bearing region is relieved. The direction of extension of the belt of the shoulder portion is in this case the direction in which the shoulder portion extends toward the buckle element and namely toward the bearing region of the buckle element.

At the same time, the mobile region displaced into its final position prevents the safety belt from being able to slide along the buckle element, by being secured thereto, i.e. the passage of the safety belt through the buckle element is completely blocked by means of the mobile region, and/or is only possible at a considerably greater force level. Thus the force limitation only acts for the shoulder portion which is relieved counter to the direction of extension of the belt and not for the further belt portion extending away from the bearing region in the direction of extension of the belt.

The blocking of the passage through the mobile region takes place before the mobile region reaches its final position. Optionally, however, a securing of the safety belt on the buckle element may be effected only in the final position of the mobile region.

For securing the safety belt (blocking the through-passage of the belt) the buckle element preferably has a locking region on which the safety belt is secured when the mobile region moves into its final position, for example by the safety belt being pressed against the locking region. Said locking region is preferably an edge region of a through-opening of the buckle element which is designed and provided for guiding and deflecting the safety belt. In a variant of the invention it is provided that the safety belt is only guided through a single through-opening of the buckle element.

According to an exemplary embodiment of the invention, the mobile region itself is designed and provided to secure the safety belt to the locking region when moved into the final position, for example by the mobile region pressing the safety belt against the locking region. In other words, the safety belt is clamped between the locking region and the mobile region.

It is, however, also conceivable in all embodiments to provide a separate clamping element which is mobile from a first into a second position and which is configured to secure the safety belt in its second position on the locking region. In this case, the clamping element may be driven by means of the mobile region or by an additional device for generating movement (for example a spring element which is relieved).

Exemplary, the mobile region and/or possibly a clamping element provided separately from the mobile region is configured to secure the safety belt to the locking region such that the mobile region and/or the separate clamping element allows a defined relative movement of the safety belt counter to the direction of extension of the belt (the safety belt slips through by a specific amount), when a force acting on the safety belt counter to the direction of extension of the belt reaches a predeterminable force level. Preferably, the clamping element is formed integrally on the mobile region, and thus represents an integral component of the mobile region.

In particular, the clamping element configured separately from the mobile region or a plurality of such elements and/or the mobile region are configured to be moved in a reversible manner, i.e. a reversible clamping of the safety belt is possible (the safety belt may be released again).

It is also possible that during displacement into the final position the mobile region tensions or also slightly relieves the further belt portion (lap portion). In the last-mentioned case, however, it is important that when a mobile region is located in the final position, the shoulder portion is relieved (released) to a substantially greater degree than the further belt portion of the safety belt.

Exemplary, the shoulder portion (shoulder belt) extends—proceeding from a belt retractor for storing a portion of the safety belt—upward in the direction of extension of the belt substantially perpendicular to the vehicle longitudinal axis and is deflected approximately at shoulder height of a passenger strapped-in by means of the safety belt according to requirements, by a shoulder belt deflection element generally arranged fixed to the vehicle in the direction of the upper body of the passenger and thus extends diagonally over the upper body of the passenger to the buckle element. From there, the further belt portion preferably extends in the form of a lap portion (lap belt) of the safety belt along the lap of the passenger to a seat belt anchoring point arranged fixed to the seat or fixed to the vehicle. In such a safety belt system the buckle element is configured as part of a seat belt buckle arrangement and has a buckle tongue, which is configured to be releasably latched to a buckle clasp fixed to the seat or fixed to the vehicle.

In one exemplary embodiment, the mobile region of the buckle element is configured as a lever which may be pivoted to and fro between the initial position and the final position. To this end the lever is pivotably secured about a rotational axis on a body of the buckle element bordering the through-opening of the buckle element, the rotational axis preferably extending from a first edge of the through-opening to a second edge of the through-opening, which opposes the first edge transversely to the direction of extension of the belt. The safety belt passes through the through-opening in the direction of extension of the belt which is used for guiding the safety belt.

Exemplary, the rotational axis is formed by a torsion element, preferably in the form of a torsion rod, which is fastened to the two opposing edges of the through-opening, and applies a predefinable torque against the pivoting of the lever from the initial position into the final position.

Exemplary, the lever has a first arm which extends in a direction of extension oriented transversely to the rotational axis. The bearing region via which the safety belt bears against the mobile region of the buckle element, is formed by a front face of the first arm, which is remote from the rotational axis of the lever. When introducing a predefinable force into the shoulder portion, which tensions the shoulder portion in the direction of extension of the belt, the first arm is pivoted with its front face, against which the shoulder portion bears in the initial position of the lever by pretension, counter to the direction of extension of the belt, i.e. in the direction of the strapped-in vehicle passenger, so that the shoulder portion is relieved, which leads to a limitation of the force introduced into the shoulder portion.

At the same time, with the pivoting of the first arm in the direction of the vehicle passenger strapped-in by means of the safety belt, the second arm of the lever is pivoted such that the safety belt is clamped in the final position of the lever between the second arm and an edge region of the through-opening extending along the rotational axis, so that the passage of the safety belt through the through-opening is blocked counter to the direction of extension of the belt.

As a result, this allows a relief of the shoulder portion (shoulder belt) in the direction of extension of the belt which preferably corresponds to an extension of the shoulder portion in the direction of extension of the belt by approximately 70 mm.

Exemplary, the edge region of the through-opening in the final position of the lever forms an abutment for the second arm of the lever so that the angle by which the lever may be pivoted about the rotational axis is limited.

In an alternative exemplary embodiment, the buckle element for limiting the pivoting movement of the lever from the initial position into the final position has a blocking element, which encompasses the body together with the lever in cross section. The blocking element is preferably of flexible configuration and is deformed during the movement of the lever into its final position. In this connection the locking element exerts on the lever a torque opposing the pivoting movement of the lever and thus allows relief of the shoulder belt bearing against the bearing region of the lever to a predeterminable force level.

In the final position of the lever, the safety belt is clamped between the second arm of the lever and the blocking element, so that the passage of the belt through the through-opening of the buckle element is blocked. In order to increase the securing of the safety belt at the through-opening, the second arm may have a surface structure with a high friction coefficient in a region with which the second arm in the final position of the lever presses the safety belt against the blocking element. Alternatively or additionally, such a surface structure for increasing the friction between the safety belt and the blocking element may also be provided on the blocking element.

Exemplary, additionally to the blocking element a latching connection is provided between the lever and the body of the buckle element, by means of which the lever in its initial position is releasably secured to the body of the buckle element, so that it may not be moved out of its initial position. The latching connection is, therefore, such that it only releases the lever with a predefinable minimum torque acting on the lever.

In an exemplary variant, by introducing a predeterminable force into the shoulder portion which tensions the shoulder portion in the direction of extension of the belt, the lever is additionally configured to be displaced in a linear manner in a displacement direction extending transversely to the rotational axis from a first position into a second position, so that the lever additionally relieves (releases) the shoulder portion in the second position. In other words, the pivoting movement of the lever from the initial position into the final position may be superimposed by an additional linear movement of the lever from the first position into the second position. To this end, the rotational axis of the lever is preferably displaceably mounted on the two edges of the through-opening of the buckle element opposing one another.

In a further exemplary embodiment, it is provided that the movement of the mobile region from the initial position into the final position consists of a deformation of the mobile region. The mobile region in this case has in the initial position a shape which, by introducing a predeterminable force into the shoulder portion which tensions the shoulder portion in the direction of extension of the belt, may be deformed in a reproducible manner into a shape corresponding to the final position. In the final position, the mobile region is then deformed such that the passage of the safety belt through the through-opening is blocked. This deformation is a plastic deformation (inelastic deformation) i.e. after such a deformation the mobile region maintains its deformed shape (three-dimensional shape).

So that the mobile region, which is preferably manufactured from a metal, may be deformed by introducing a force into the shoulder portion such that the passage of the belt through the through-opening is blocked, the mobile region is preferably partially configured in the form of a loop, on which the through-opening of the buckle element is configured, which in the direction of extension of the safety belt opposes a further through-opening configured on the loop.

The loop also has a free end portion which extends away from the first through-opening in the direction of extension of the belt in the direction of the further through-opening, the bearing region of the loop-shaped mobile region being formed by an edge portion of the first through-opening, about which the safety belt is positioned for deflecting the safety belt. The mobile region is thus configured so that when introducing a predeterminable force into the shoulder portion, which tensions the shoulder portion in the direction of extension of the belt, the bearing region is displaced counter to the direction of extension of the belt, the free end portion of the loop and/or of the mobile region pushing into the further through-opening and securing the safety belt there. As a result, the passage of the belt through the two through-openings is blocked.

In a further exemplary embodiment, the bearing region of the mobile region is formed by a narrow front face of a free end portion of the mobile region, the loop of the mobile region preferably being designed and provided when displacing the bearing region, i.e. when deforming the mobile region from the initial position into the final position, to be pulled tight, so that the safety belt extending through the two through-openings and passing through the loop of the mobile region, is secured in the loop.

In a further exemplary embodiment, the mobile region is configured as a deflecting body for deflecting the safety belt which is connected via at least one deformation element to a part of the buckle element which is at rest relative to a buckle tongue of the buckle element, said part in particular being a housing for receiving the mobile region.

Exemplary, the at least one deformation element is configured to be deformed in a reproducible manner by the action of a predeterminable force acting on the shoulder portion which tensions the shoulder portion in the direction of extension of the belt, the mobile region being moved in a direction of movement in a linear manner from the initial position into the final position.

In an exemplary variant the deformation element is configured as a strap, in particular a sheet metal strap, the strap being deformed by roll bending or, in other words, the sheet metal strap having a curvature which when deforming the strap alters its position on the strap.

In an alternative exemplary variant, the deformation element is configured as a loop, the mobile region preferably being coupled to the loop such that the mobile region slides along the loop when moving into its final position, the loop being at least partially deformed such that a predeterminable resistance is applied against the movement of the mobile region into the final position. Preferably, the loop forms a stop for the mobile region such that the movement of the mobile region is limited in the final position.

In a further exemplary embodiment the deformation element is configured as an elongate pin, which has a first portion extending transversely to the direction of movement and a second portion connected integrally thereto, extending in the direction of movement of the mobile region, via which the pin is connected to the part (housing) of the buckle element, the pin being inserted positively with the first portion preferably into a blind hole-shaped recess of the mobile region extending transversely to the direction of movement, and being withdrawn from that recess by deformation, with the movement of the mobile region from the initial position into the final position, in order to apply a predeterminable resistance against the movement of the mobile region. Said resistance may, in this case, be adjusted by means of the pin strength and/or the material composition of the pin(s).

In a further exemplary embodiment, the at least one deformation element is configured as a first spring element, i.e. as an elastic resilient element, which applies a resilient force against the movement of the mobile region in the final position thereof. In other words, the movement of the mobile region takes place counter to the spring force. By the use of a resilient spring element, the buckle element may advantageously limit the force acting on the shoulder portion in a reversible manner and may therefore be used repeatedly.

For damping the (usually translatory) movement of the mobile region a damping element is provided, via which the mobile region is preferably connected to a part of the buckle element which is at rest relative to a buckle tongue of the buckle element, in which in particular said part is a housing encompassing the mobile region.

If required, a plurality of the deformation elements disclosed above may be provided for controlling the relieving movement of the mobile region.

Moreover, in a development it is provided that the deformation element combines the properties both of a spring element and a damping element. In other words, the deformation element has an integral damping element, (said damping element may be configured integrally with the deformation element and/or spring element).

This feature of combining both the resilient function and the damping function in one element is, on the one hand, able to be implemented and controlled via the shape of the deformation element per se and, on the other hand, via the material composition thereof.

In order to block the through-passage of the belt, in particular before the relieving movement of the mobile region, it is provided that the mobile region itself is configured to fix and/or secure the safety belt to the locking region. Alternatively, it is also conceivable to provide a clamping element configured separately from the mobile region, which is mounted on a part of the buckle element in a linear displaceable manner in a direction oriented transversely to the direction of movement of the mobile region, in order to press the safety belt against the locking region. In this case, it is also conceivable to drive the clamping element independently of the mobile region or by means of the mobile region.

Alternatively to the aforementioned (linear displaceable) mounting of the (separate) clamping element, said clamping element is preferably pivotably mounted on a part of the buckle element, in particular on said housing of the buckle element, so that it may be pivoted from its first position into its second position, in which the clamping element presses the safety belt against the locking region for blocking the through-passage of the belt. Preferably, it is provided in this case that the clamping element secures the safety belt, in the second position of the clamping element, to the locking region such that the safety belt is deflected a second time, and namely preferably by 180°.

In a further exemplary variant, the deformation element is additionally displaceable in a linear manner in the direction of movement of the mobile region from a first position into a second position, when a predeterminable force which tensions the shoulder portion in the direction of extension of the belt, acts on the shoulder portion and acts via the bearing region counter to the direction of extension of the belt of the shoulder portion on the mobile region.

Exemplary, the safety belt is secured to the locking region when the deformation element is moved into the second position. For example, this is achieved by the deformation element itself pressing the safety belt against the locking region or releasing a separate clamping element and/or moving said clamping element into its second position.

Exemplary, the aforementioned mounting of the deformation element is such that the deformation thereof takes place after the displacement into the second position.

In a further exemplary embodiment, the bearing region is coupled to the mobile region which is movable to and fro between a first and a second position, such that the bearing region, by the action of a force acting on the shoulder portion which tensions the shoulder portion in the direction of extension of the belt, is moved from the first position in the direction of the mobile region into the second position, and namely before the mobile region is moved by said force into its final position.

In this case, the bearing region may be coupled to the clamping element for moving the (separate) clamping element from the first position into the second position such that a movement of the bearing region from the first position into the second position produces and/or triggers a movement of the clamping element from the first into the second position. Preferably, to this end the bearing region is coupled via at least one second spring element to the mobile region.

Exemplary, however, in the above embodiments the clamping element is configured integrally with the mobile region, so that the fixing and/or securing of the safety belt on the buckle element (locking region) is carried out by the mobile region itself.

Exemplary, the locking region is a part of the housing at least partially surrounding the mobile region and namely, in particular, a portion of an inner face of the housing facing the mobile region.

Exemplary, the mobile region is connected to a body of the buckle element, in particular integrally, the body naturally also being able to be the aforementioned housing for receiving the mobile region.

Preferably, moreover, on the body of the buckle element, a buckle tongue is configured which projects from the body of the buckle element in a longitudinal direction of extension and which is designed and provided to be inserted in the longitudinal direction of extension into a buckle clasp, the buckle tongue being releaseably latched to the buckle clasp.

In an exemplary variant, the buckle tongue is connected to the body of the buckle element via two linear weakened regions extending in the longitudinal direction of extension, in particular integrally, the weakened regions (for example regions of lower material strength or perforated regions), being configured to tear in the longitudinal direction of extension, when a predeterminable force acts counter to the longitudinal direction of extension on the buckle tongue. Said force is in this case absorbed by the buckle clasp.

Such a force tearing the weakened regions may be introduced, for example, via the safety belt into the buckle element.

Exemplary, the buckle tongue is effectively lengthened by the tearing of said weakened regions in the longitudinal direction of extension, whereby the shoulder portion is additionally relieved. In principle, this additional relief of the shoulder portion may be activated depending on the design of the weakened regions i.e. together with the movement of the mobile region from the initial position into the final position or as additional force limiting measures. In this case, the required minimum force for tearing the weakened regions is greater than said force which, acting on the bearing region of the mobile region, may move the mobile region from the initial position into the final position.

In an exemplary further variant, a further force limiter acting on the shoulder portion is provided. This is preferably provided on a belt retractor, from which the safety belt may be withdrawn in the direction of extension of the belt. The belt retractor provides a pretensioning of the safety belt in the direction of extension of the belt. The force limiter provided on the belt retractor produces the action which limits the belt force and thus the relief of the shoulder belt in the direction of extension of the belt, preferably by withdrawing (releasing) the safety belt, to a predeterminable force level. The relief of the safety belt corresponds in this case to an increase in length of the shoulder portion of the safety belt (shoulder belt) in the direction of extension of the belt of preferably up to 300 mm.

The shoulder portion extends from the belt retractor to the buckle element in the direction of extension of the belt. Preferably, the shoulder portion of the safety belt in this case is deflected in the direction of extension of the belt by a further belt guide element, which is preferably a shoulder belt deflection element.

BRIEF DESCRIPTION OF THE DRAWINGS

Further details and advantages of the invention are made clear in the following description of embodiments with reference to the figures, in which:

FIG. 2 shows a diagram in which the force acting in the direction of extension of the belt on the safety belt is shown in the event of deceleration of the motor vehicle.

FIG. 3 shows a schematic representation of a path of a safety belt of a three-point safety belt system, comprising a buckle element, which comprises a pivotable lever located in an initial position, which is used for limiting a force acting on a shoulder belt.

FIG. 4 shows the belt path shown in FIG. 3, with a mobile region in the form of a lever, which is pivoted from the initial position shown in FIG. 3 into a final position, in which the lever relieves the shoulder belt in order to limit the force introduced into the shoulder belt.

FIG. 5 shows a schematic plan view of a buckle element with a mobile element in the form of a lever which is pivotably mounted about a rotational axis in a through-opening of a body of the buckle element.

FIG. 6 shows a schematic partially sectioned view of the buckle element shown in FIG. 5 along the line VI-VI of FIG. 5, with a lever located in its initial position.

FIG. 7 shows a schematic partially sectioned view along the line VI-VI of FIG. 5, the lever being pivoted into its final position.

FIG. 8 shows a schematic partially sectioned view along the line VI-VI of FIG. 5, with a lever located in the final position, which is additionally moved in a linear manner along the body of the buckle element.

FIG. 9 shows a schematic plan view of a modification of the buckle element shown in FIG. 5.

FIG. 10 shows a schematic partially sectioned view of the buckle element shown in FIG. 9 along the line X-X of FIG. 9.

FIG. 11 shows a schematic partially sectioned view of the buckle element shown in FIG. 9 along the line X-X of FIG. 10, with a lever which is pivoted out of its initial position, the lever pressing the safety belt against a blocking element, so that the passage of the belt through the buckle element is blocked.

FIG. 12 shows a partially sectioned view of the buckle element shown in FIG. 9 along the line X-X of FIG. 9, with a lever pivoted into its final position.

FIG. 13 shows a further plan view of a modification of the buckle element shown in FIGS. 5 to 12, with a mobile region which may be deformed from an initial position into a final position.

FIG. 14 shows a schematic sectional view of the deflecting element shown in FIG. 13 along the line XIV-XIV of FIG. 13, the mobile region being arranged in its initial position.

FIG. 15 shows a schematic sectional view of the buckle element shown in FIG. 13 along the line XIV-XIV of FIG. 13, the mobile region thereof being deformed such that the passage of the belt through the two through-openings of the mobile region is blocked.

FIG. 16 shows a schematic sectional view of the buckle element shown in FIG. 13 along the line XIV-XIV of FIG. 13, with a mobile region deformed into the final position.

FIG. 17 shows a further modification of the buckle element shown in FIGS. 5 to 16.

FIG. 18 shows a schematic sectional view of the buckle element shown in FIG. 17 along the line XVIII-XVIII of FIG. 17, the mobile region being arranged in its initial position.

FIG. 19 shows a schematic sectional view of the buckle element shown in FIG. 17 along the line XVIII-XVIII of FIG. 17, the mobile region thereof being deformed such that the passage of the belt through two through-openings of the mobile region is blocked.

FIG. 20 shows a schematic sectional view of the buckle element shown in FIG. 17, along the line XVIII-XVIII of FIG. 17 with a mobile region deformed into the final position.

FIG. 21 shows a plan view of a front side of a buckle element with a buckle tongue which is partially connected to a body of the buckle element via weakened regions which may be torn.

FIG. 22 shows a schematic partially sectioned view of the buckle element shown in FIG. 21 along the line XXII-XXII of FIG. 21.

FIG. 23 shows a plan view of a rear side remote from the front side of the buckle element shown in FIG. 21.

FIG. 24 shows a schematic sectional view of a further exemplary embodiment of a buckle element according to the invention with a mobile region which is connected to a housing of the buckle element via a damped spring element.

FIG. 25 shows a schematic sectional view of a modification of the buckle element shown in FIG. 24, in which the mobile region is secured by means of a deformable sheet metal strap to the housing of the buckle element.

FIG. 26 shows a schematic sectional view of a modification of the buckle element shown in FIG. 25 with two sheet metal straps opposing one another for coupling the mobile region to the housing of the buckle element.

FIG. 27 shows a schematic partially sectioned view of a modification of the buckle element shown in FIG. 25, with two sheet metal straps arranged on the front faces.

FIG. 28 shows a schematic sectional view of a further embodiment of the buckle element according to the invention, in which the mobile region is coupled by means of deformable pins to the housing.

FIG. 29 shows a schematic partially sectioned view of a modification of the buckle element shown in FIG. 28, in which the mobile region is connected to the housing via a deformable sheet metal loop.

DETAILED DESCRIPTION

Figure 1:
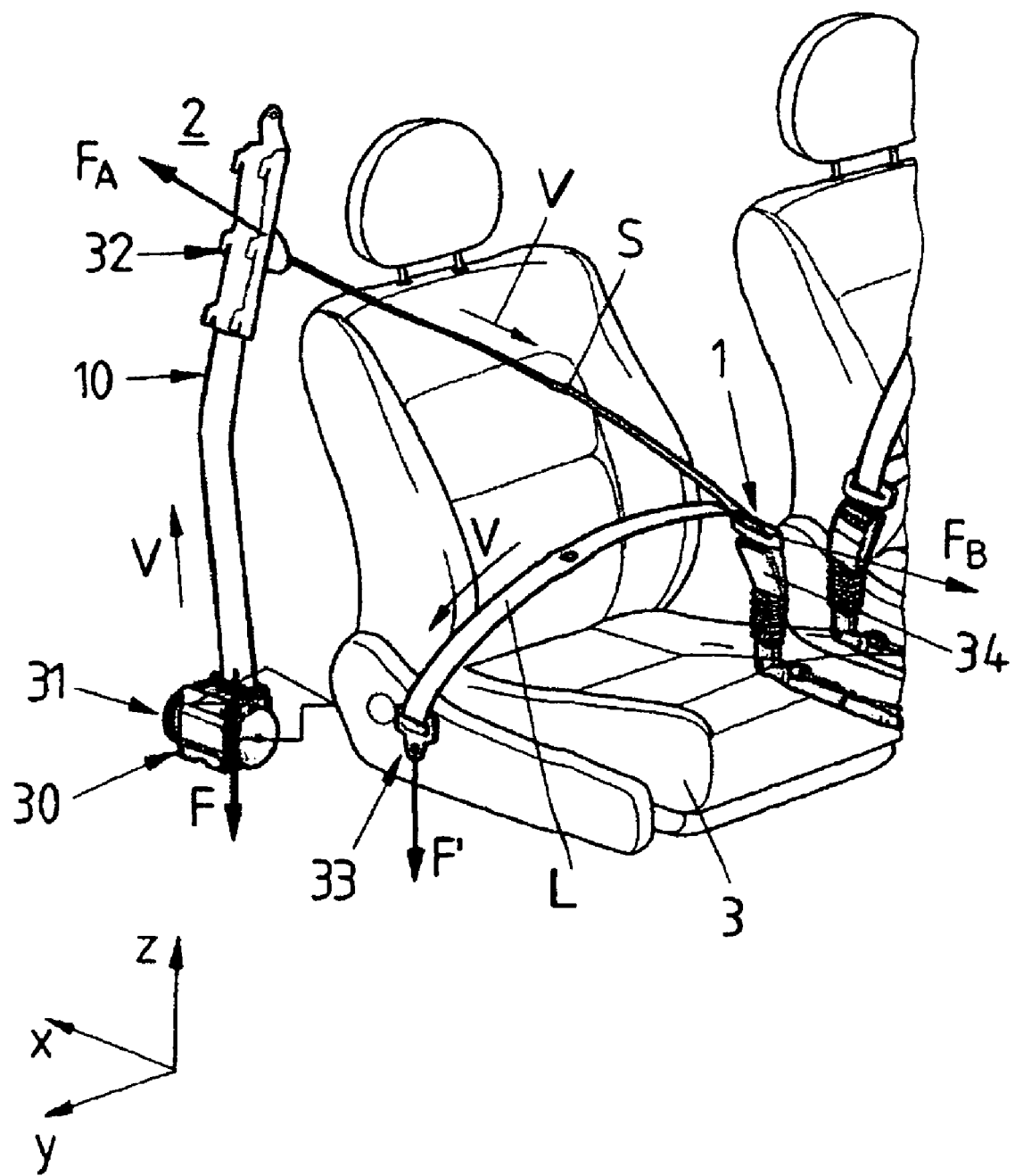
FIG. 1 shows a perspective schematic view of a vehicle seat with a three-point safety belt which, proceeding from a retractor (belt retractor), extends in a direction of extension of the belt via a shoulder belt deflection element and a buckle element to a belt anchoring point provided on the seat.
Figure 1A:
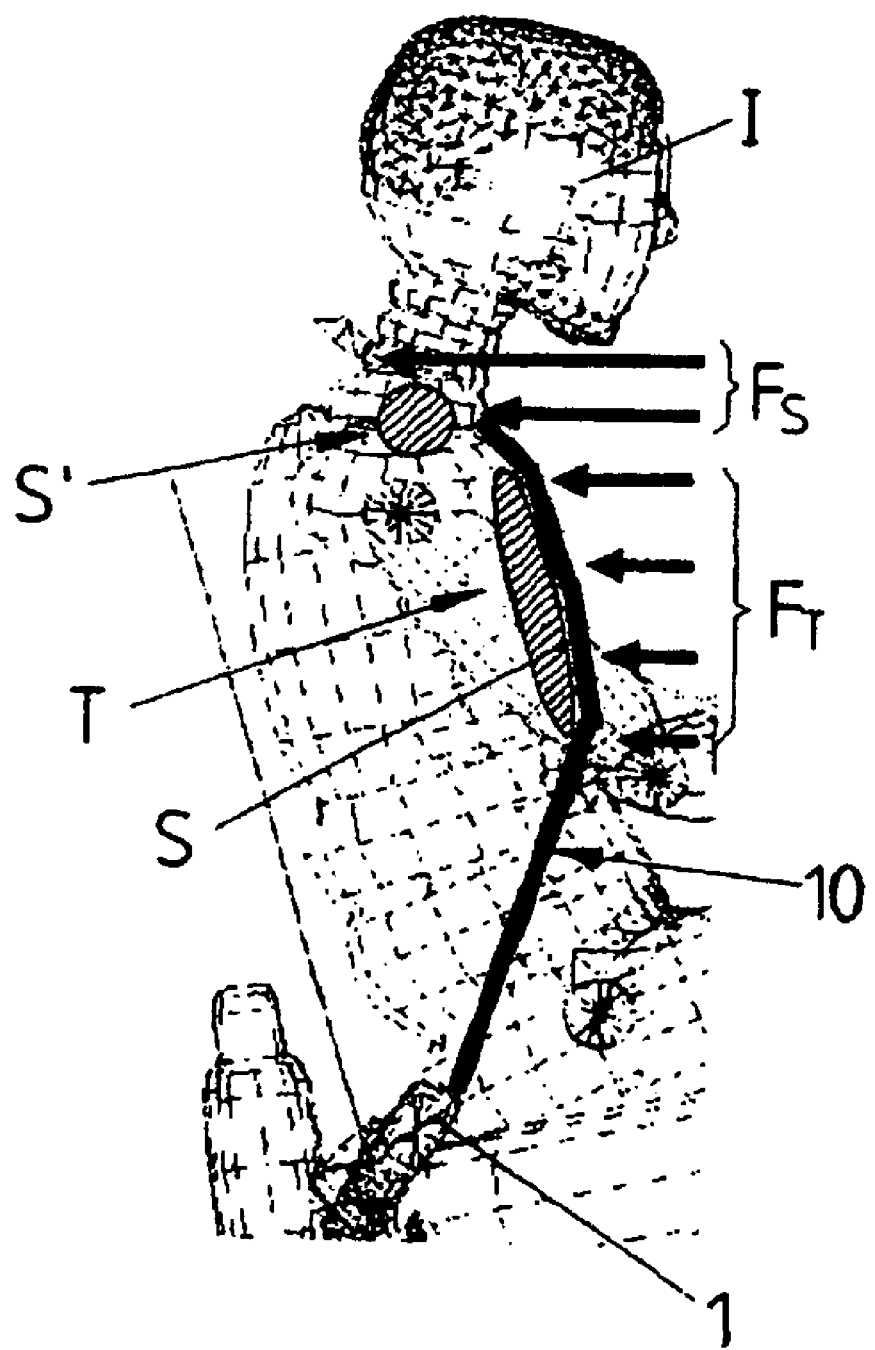
FIG. 1A shows a side view of a passenger of a motor vehicle strapped-in by means of a shoulder belt.

FIG. 1 shows in connection with FIG. 1A a perspective view of a vehicle seat 3 with a three-point safety belt system 2. The safety belt system 2 comprises a safety belt 10 which is at least partially rolled up into a belt retractor 30 arranged fixed to the vehicle or stored there, the safety belt 10 being able to be withdrawn from the belt retractor 30 in a direction of extension of the belt V.

If the safety belt 10 is placed on a vehicle passenger I occupying the vehicle seat 3, the safety belt 10 has the following known belt path: proceeding from the belt retractor 30 the safety belt 10 extends in the direction of extension of the belt V substantially along the vertical vehicle axis z upward to a shoulder belt deflection fitting 32 arranged fixed to the vehicle, which may be configured to be height-adjustable along the vertical vehicle axis z, said belt is deflected by means of this shoulder belt deflection fitting 32 and then extends along the vertical vehicle axis z in the direction of extension of the belt V diagonally over the upper body of the vehicle passenger I located on the vehicle seat downward to a buckle element 1.

On the buckle element 1 a buckle tongue 28 is formed (see FIGS. 5 to 23) which in the strapped-in state of the vehicle passenger I along its longitudinal direction of extension 27 is inserted into a buckle clasp 34 secured to the vehicle and thus is releasably locked in the buckle clasp 34. By means of the buckle element 1 the safety belt 10 is deflected and extends over a lap region of the vehicle passenger I and, bearing thereagainst in the direction of extension of the belt V, to a belt anchoring point 33 secured to the vehicle seat 3.

The belt deflection device 1 which is arranged along the vertical vehicle axis z approximately level with the hips of a vehicle passenger I occupying the seat 3, subdivides the safety belt 10 in the direction of extension of the belt V into two belt portions, namely a shoulder portion or shoulder belt S which, proceeding from the belt retractor 30, extends diagonally over the upper body of the strapped-in vehicle passenger I to the buckle element 1 and a lap portion or lap belt L which extends from the buckle element 1 proceeding in the direction of extension of the belt V to the seat belt anchoring point 33.

By means of the belt retractor 30 the safety belt 10 is pretensioned against the upper body of the vehicle passenger I so that it bears thereagainst.

In the case of an accident, for example a head-on collision, the vehicle is decelerated counter to the direction of travel, i.e. along the vehicle longitudinal axis x, the vehicle passenger I strapped-in by means of the safety belt 10 on the vehicle seat 3, as a result of his or her inertia along the vehicle longitudinal axis x, being forced against the safety belt 10, and namely the shoulder belt S and the lap belt L, and namely with a force which corresponds to the inertia of the vehicle passenger. This force acts on the safety belt 10 and tensions said safety belt in the direction of extension of the belt V.

The forces tensioning the safety belt 10 are substantially introduced into the motor vehicle and/or the vehicle seat 3, on the one hand, on the belt retractor 30 and, on the other hand, —with a buckle element 1 with a free through-passage for the belt—on the belt anchoring point 33. The force introduced on the belt retractor 30 is in this case oriented counter to the direction of extension of the belt V whilst the belt force F' acting on the belt anchoring point 33 extends in the direction of extension of the belt V.

In a conventional safety belt system 2, in which the belt force is only limited on the belt retractor 30, for example by means of a force limiter 31 arranged on the belt retractor 30, the force F tightening the safety belt 10 in the direction of extension of the belt V increases, due to the frictional connection between the safety belt 10 and the vehicle passenger I strapped-in in the direction of extension of the belt V. This results in the path of the force F in the direction of extension of the belt V, shown in FIG. 2 by the solid line (on the ordinate), marking positions of the belt path (buckle element 30, shoulder belt deflection element 32, buckle element 1 and belt anchoring point 33) being identified on the abscissa of the diagram shown in FIG. 2. By the frictional connection between the vehicle passenger I and the safety belt 10, the force F increases in particular in the chest region T of the vehicle passenger I, so that the forces introduced during restraint into the upper body of the vehicle passenger I are considerably greater in the chest region T which is susceptible to injury than on the relatively robust shoulder region S' of the vehicle passenger I. This is also a drawback in that due to the leverage of the human body a restraining force $F_S$ acting in the region of the shoulder S' of the vehicle passenger makes the most important contribution to the restraint of the vehicle passenger, as the associated lever arm is at a maximum. In contrast thereto, a restraining force $F_T$ acting on the chest region of the vehicle passenger has a smaller lever arm and must therefore be relatively larger, in order to achieve the same amount of restraint of the vehicle passenger I, as the force $F_S$ acting on the shoulder region S'.

In order to reduce the restraining forces $F_T$ acting on the chest region T of the vehicle passenger I, the buckle element 1 has a mechanism which, on the one hand, blocks the passage of the safety belt 10 through the buckle element 1 in the event of a dangerous situation, i.e. in the case of restraint, and on the other hand limits the force $F_B$ on the buckle element 1, tensioning the shoulder belt S in the direction of extension of the belt V in a dangerous vehicle situation.

As a result, the path of the belt force F shown in FIG. 2 by the dotted line is achieved in the direction of extension of the belt V in which, due to the belt force limitation on the buckle element 1, the force F tensioning the safety belt 10 in the direction of extension of the belt V, proceeding from the shoulder belt deflection element 32 in the direction of extension of the belt V, reduces so that the forces $F_S$, $F_T$ introduced in the event of an accident into the upper body of the vehicle passenger I along the vehicle longitudinal axis x are greater in the shoulder region S' of the vehicle passenger I than in the chest region T. Thus by means of the force limitation of the shoulder portion S undertaken on the buckle element 1 the restraint of the vehicle passenger I in the event of an accident is improved and at the same time, the risk of injury to the vehicle passenger I, in particular in the chest region T, is reduced.

FIG. 3 shows in connection with FIGS. 5 to 8 a schematic view of the safety belt system 2 shown in FIG. 1, with a buckle element 1 for limiting a force tensioning the safety belt 10 in the direction of extension of the belt V. Such a force, for example when decelerating the vehicle along the vehicle longitudinal axis x is introduced into the safety belt 10 due to the inertia of the strapped-in vehicle passenger.

The buckle element 1 has a frame-shaped body 23 which defines a through-opening O through which the safety belt 10 may freely pass. A buckle tongue 28 projects from the body 23 of the buckle element 1 in a longitudinal direction of extension 27, which is configured as flat as the body 23 of the buckle element and extends in the same extension plane. The buckle tongue 28 is able to be inserted along the longitudinal direction of extension 27 into a buckle clasp 34 and may be locked there. The frame-shaped body 23 has edges 13, 14 of the through-opening O, opposing one another transversely to the longitudinal direction of extension 27, on which a mobile region B of the buckle element 1 in the form of a lever is pivotably secured about a rotational axis 12 configured as a torsion rod, which extends transversely to the longitudinal direction of extension 27 of the buckle tongue 28 between the two edges 13, 14 of the body 23.

The lever B of the buckle element 1 is shaped in a two-dimensional, rectangular manner and has a first arm 15 and a second arm 16 which project opposing one another in a direction of extension 17 of the lever B from the rotational axis 12 and/or the torsion rod 12 of the lever B. In this case, the first arm 15 is configured longer in the direction of extension 17 of the lever B than its second arm 16. The lever B is pivotable about its rotational axis 12 from an initial position into a final position. In this connection, the torsion rod 12 applies a predefinable torque against the pivoting motion so that the lever B may be pivoted from the initial position into its final position only when exceeding a minimum torque.

In the initial position of the lever B the first arm 15 of the lever B projects from a side of the body 23 remote from the strapped-in vehicle passenger I from the extension plane of the body 23 and thus forms an acute angle with the body 23 and/or the buckle tongue 28 of the buckle element 1. In this initial position of the lever B and/or of the first arm 15 of the lever B, the safety belt 10 extending away in the direction of extension of the belt V from the shoulder belt deflection element 23—extending above the body 23 of the buckle element 1—is guided to the first arm 15 of the lever B and positioned around said lever in the direction of extension of the belt V, so that the safety belt 10 is deflected in the direction of the lap of the vehicle passenger I. In this case, the safety belt 10, under pretension which is provided with a safety belt 10 positioned on a vehicle passenger I by the belt retractor 30, bears against a narrow front face of the first arm 15 of the lever B, which face is remote from the body 23 of the buckle element 1 and forms a bearing region A of the first arm 15 of the lever B.

The mobile region B thus defines a subdivision of the safety belt 10 into two belt portions, namely a shoulder belt S which extends away counter to the direction of extension of the belt V from the bearing region A and a lap belt L which extends away in the direction of extension of the belt V from the bearing region A and extends through the through-opening O of the body 23 in the direction of extension of the belt V to the belt anchoring point 33.

Via the bearing region A, a force which tightens the safety belt 10 in the direction of extension of the belt V may be introduced into the lever B such that said lever is moved from its initial position according to FIG. 6 into its final position according to FIG. 7. In this case, the torsion rod 12 applies a predeterminable torque against the pivoting movement of the lever B from the initial position into the final position, so that the lever B, only with a minimum force introduced into the safety belt 10, for example as a result of a deceleration of the motor vehicle as a result of an accident, is pivoted out of the initial position into the final position. If a force tensioning the safety belt 10 in the direction of extension of the belt V is sufficient to pivot the lever B from the initial position into the final position, in this connection the first arm 15 of the lever B together with the bearing region A against which the safety belt 10 bears under pretension, is pivoted counter to the direction of extension of the belt V of the shoulder belt S in the direction of the shoulder belt deflection element 32, whereby the shoulder belt S is relieved counter to the direction of extension of the belt V.

At the same time, the second arm 16 of the lever B which projects in the initial position on a side of the body 13 facing the vehicle passenger from the extension plane of the body 23 of the buckle element 1, is pivoted in the direction of the body 23, said second arm in the final position of the lever B clamping the safety belt 10 between its free end and a web-shaped edge region 21 of the through-opening O defining the through-opening O below the rotational axis 12, so that the passage of the safety belt 10 through the through-opening O is blocked.

As a result, only the force $F_B$ tensioning the safety belt S in the direction of extension of the belt V is limited on the buckle element 1, whilst the forces tensioning the lap belt L by blocking the through-passage of the belt are held at a constant level. In typical crash conditions, a limitation of said force $F_B$ to 2.5 kN is possible, relative to a force $F_B$ of 6 kN on the buckle element 1 acting on the shoulder portion S, where the safety belt 10 is able to pass freely through the buckle element 1 and the force is only limited on the belt retractor 30.

Additionally to the pivoting movement of the lever B from the initial position into the final position, the lever B according to FIG. 8 is designed to be moved in a linear manner from a first position counter to the longitudinal direction of extension 27 of the buckle tongue 28 into a second position, in which the lever B—relative to an installed state in a motor vehicle—is positioned along the vertical vehicle axis z more closely to the shoulder belt deflection element 32 than in its first position. Thus, also by means of the linear movement of the lever B the shoulder belt S is relieved in the direction of extension of the belt V, which allows an additional limitation of the belt force $F_B$ acting on the buckle element 1.

For the linear movement of the lever B, the torsion rod 12 thereof is respectively mounted with one free end 12a in a guide groove 12b, the guide grooves 12b being configured opposing one another on the two edges 13, 14 of the body 23, and extending in the longitudinal direction of extension 27. Preferably, on the two guide grooves 12b spring elements are provided which apply a predefinable restraining force against a displacement movement of the torsion rod 12 and/or of the lever B from the first position into the second position.

FIG. 4 shows a schematic view of the safety belt system 2 with a lever B located in the final position. The relief of the shoulder belt S in the direction of extension of the belt V may be also characterized by the angle W, which the first arm 15 of the lever B encloses with the shoulder belt S extending away from the first arm 15 counter to the direction of extension of the belt V. In the initial position the bearing region A, i.e. the front face of the first arm 15 in the direction of extension of the belt, has a greater distance from the shoulder belt deflection element 32, than in the final position of the lever B. As a result, in the initial position of the lever B the angle W enclosed between the first arm 15 and the shoulder belt S is smaller than in the final position of the lever B, in which the first arm 15 of the lever B is pivoted in the direction of the vehicle passenger and/or the shoulder belt deflection element 32.

FIG. 9 shows a schematic plan view of a modification of the buckle element 1 shown in FIGS. 5 to 8, in contrast to FIG. 5 the pivoting movement of the lever B from the initial position according to FIG. 10 into its final position according to FIG. 12 not being defined by a web-shaped edge region 21 of the through-opening O but by a blocking element 22 which encompasses the frame-shaped body 23 and the lever B and namely the first arm 15 thereof, in cross section. The blocking element 22 has a first and a second limb 22b, 22c extending along the rotational axis 12, of which the first limb 22b is provided to bear against the first arm 15 of the lever B and the second limb 22c to bear against the second arm 16 of the lever B.

In the initial position of the lever B the two limbs 22b, 22c of the blocking element 22 are respectively arranged at a distance from the first and/or second arm 15, 16 of the lever B. When pivoting the lever B from its initial position into its final position, the second arm 16 of the lever B is guided against the second limb 22c and by interposing the safety belt 10 is pressed against the second limb 22c of the blocking element 22. As a result, the passage of the safety belt 10 through the through-opening O is blocked. Moreover, the first arm 15 of the lever B when pivoting the lever B into the final position thereof is guided against the first limb 22b of the blocking element 22 and pressed against said limb, the blocking element 22 and/or the second limb 22c being elastically deformed. As a result, the blocking element 22 exerts a torque on the lever B which counters the pivoting movement of the lever B in the final position thereof and limits said pivoting movement in the final position.

In the embodiment of the buckle element 1 shown in FIGS. 9 to 12, the lever B may also be moved counter to the longitudinal direction of extension 27 from a first position into a second position in a linear manner, as is already illustrated with reference to FIGS. 5 to 8. The linear movement of the lever B in the above described embodiments is, however, not absolutely necessary, but represents an optional additional measure.

In contrast to the embodiment of the buckle element 1 shown in FIGS. 5 to 8, in the embodiment of the buckle element 1 shown in FIGS. 9 to 12, a releasable connection 22a configured as a latching connection is provided, by means of which the first arm 15 of the lever B may be locked in its initial position on the body 23 of the buckle element 1. The releasable connection 22a is in this case formed by two pins 40, which in opposing directions project from sides of the first arm 15, which are remote from one another, along the rotational axis 12 of the lever B, and respectively may engage in a recesses 41 configured on the two edges 13, 14 of the body 23, the two pins 40 in the initial position of the lever B engaging in the recesses 41. The latching connection 22a is, therefore, designed such that the pins 40 of the first arm 15 come out of engagement from the recesses 41 only when a predeterminable minimum torque acts on the lever B. As a result, in particular a pivotable securing of the lever B to the body 23 via the torsion rod 12 may be dispensed with and instead, the lever B may be mounted via a rigid shaft 12 on the body 23 and namely on the two opposing edges 13, 14 of the body 23.

FIG. 13 shows in connection with FIGS. 14 to 16, a further embodiment of the buckle element 1, in which in contrast to FIGS. 5 to 12, the mobile region B of the buckle element 1 is not formed by a pivotable lever but by a mobile region B connected integrally to the body 23 of the buckle element 1, which by introducing a predeterminable force into the safety belt 10, which tensions the safety belt 10 in the direction of extension of the belt V, may be deformed from an initial position into a final position such that, on the one hand, the passage of the safety belt 10 through the belt deflection device 1 is blocked and, on the other hand, the force $F_B$ acting on the belt deflection device 1 on the shoulder belt S, is limited by a relief of the shoulder belt S in the direction of extension of the belt V.

The buckle element 1 has a two-dimensional body 23 from which, as disclosed above, a buckle tongue 28 projects in a longitudinal direction of extension 27. The buckle tongue 28 is in this case extended in the extension plane of the body 23 of the buckle element 1. The mobile region B of the buckle element 1 moves in one piece counter to the longitudinal direction of extension 27 of the body 23 of the buckle element 1—opposing the buckle tongue 28 in the longitudinal direction of extension 27—and is shaped in cross section to form a loop B' with an elongate end portion 25 which extends in the direction of extension of the belt V of the lap belt L along a partial portion of the lap belt L.

The shoulder belt S of the safety belt 10, proceeding from the shoulder belt deflection element 32, not shown, extends in the direction of extension of the belt V to a through-opening O configured on the loop B' and is passed through said through-opening, the safety belt 10 being positioned around an edge portion of the through-opening O configured as a bearing region A which in the initial position of the mobile region B faces the vehicle floor, and bears against this bearing region A under pretensioning provided by the belt retractor 30. The safety belt 10, deflected to such an extent, extends from the bearing region A as a lap belt L along the free end portion 25 to a further through-opening O' of the loop B', which opposes the first through-opening O in the direction of extension of the belt V and/or along the end portion 25 of the loop B'.

The mobile region B comprising the loop B' is designed such that a force acting on the safety belt 10 which tensions the safety belt 10 in the direction of extension of the belt V and exceeds a predeterminable minimum force, is introduced into the bearing region A of the mobile region B, such that initially the free end portion 25 of the loop B' is guided along the lap belt L against the further through-opening O', so that it clamps the lap belt L passing through. As a result, according to FIG. 15 the passage of the belt through the two through-openings O, O' of the loop B' is, as a whole, blocked.

In the further path, by means of the belt force introduced into the bearing region A, which tensions the safety belt 10 in the direction of extension of the belt V, the bearing region A is displaced counter to the direction of extension of the belt V of the shoulder belt S toward the shoulder belt deflection element 32 and/or toward the restrained vehicle passenger I and namely by deformation of the mobile region B. The deformation of the mobile region B corresponds in this case substantially to a rotation of the loop B' about the region of the further through-opening O' in the direction of the vehicle passenger I and/or the shoulder belt deflection element 32. In this case, the shoulder belt S is relieved in the direction of extension of the belt V, as already shown in FIG. 4, which results in a limitation of the belt force $F_B$, acting on the shoulder belt S in the vicinity of the buckle element 1 and acting in the direction of extension of the belt V.

The deformation of the mobile region B as a result of the force acting, in the event of restraint, on the safety belt 10 is, on the one hand, able to be influenced by the shape of the mobile region B, i.e. substantially by the shape of the loop B', as well as via the material structure of the mobile region B, which is preferably manufactured from a metal. In particular, the points about which a rotation of the loop B' is to be carried out may have a lower material strength so that a deformation preferably takes place in this region. Such regions are, for example, provided by the through-openings O, O' which locally weaken the mobile region B.

FIGS. 17 to 20 show a modification of the buckle element 1 shown in FIGS. 13 to 16. In this case, in contrast to the buckle element 1 shown in FIGS. 13 to 16, the mobile region B is configured in the form of a loop B', which when deforming the mobile region B from the initial position into the final position is crushed and clamps the lap belt L extending therethrough, so that the passage of the belt through the belt deflection device 1 is blocked.

To this end, the shoulder belt S of the safety belt 10 proceeding from the shoulder belt deflection element 32 in the direction of extension of the belt V of the lap belt L extends to a free end portion 25 of the mobile region B and is positioned about a front face of the free end portion 25—facing in the initial position of the mobile region B in the direction of the vehicle floor—which forms a bearing region A for the safety belt 10. The safety belt 10 bears, under pretension which is provided by the belt retractor 30, against the bearing region A, the safety belt 10 being deflected on the bearing region A, and being subdivided into two belt portions, namely the shoulder belt S and the lap belt L, the lap belt L in the direction of extension of the belt V extending through an opening O" of the buckle element 1 configured in the body 23 of the buckle element 1. A through-opening O is aligned with this opening O", as well as a further through-opening O' located opposite the through-opening in the direction of extension of the belt V of the lap belt L, which respectively are configured on a portion of the mobile region B configured as a closed loop B'.

The loop B' is arranged relative to the bearing region A of the free end portion 25 of the mobile region B such that a force tensioning the safety belt 10 in the direction of extension of the belt V, which is above a specific minimum force, displaces the bearing region A about which the safety belt 10 is positioned, counter to the direction of extension of the belt V of the shoulder belt S, the end portion 25 of the mobile region B compressing the loop B', so that the lap belt L passing through the loop B', is constricted in the crushed loop B'. As a result, the passage of the belt through the two through-openings O, O' and/or through the openings O" of the body 23 of the buckle element 1 is blocked.

At the same time, by the deformation of the mobile region B from the initial position of the mobile region into the final position corresponding to FIG. 20, the bearing region A is displaced in the direction of the vehicle passenger and/or the shoulder belt deflection element 32, whereby the shoulder belt S is relieved in the direction of extension of the belt. As a result, the belt force $F_B$ acting on the shoulder belt S in the vicinity of the buckle element 1, in the direction of extension of the belt V of the shoulder belt S, is limited as disclosed above.

The deformation of the mobile region B from the initial position into the final position consists substantially of a rotation of the free end portion 25 of the mobile region B about a region of the loop B' containing the through-opening O, in the direction of the vehicle passenger I and/or the shoulder belt deflection element 32.

FIG. 21 shows in connection with FIGS. 22 and 23 a mechanism by which in the event of restraint the belt force $F_B$ acting on the shoulder belt S in the vicinity of the buckle element 1, may be additionally limited. To this end, the two-dimensional body 23 of the buckle element 1 of the type disclosed in FIGS. 5 to 20 is bent back on a two-dimensional portion located opposite the mobile region B in the longitudinal direction of extension 27, which is preferably manufactured from a metal, so that said portion of the body 23 is subdivided into a first portion 23a and a bent-back second portion 23b extending parallel thereto, which are connected to one another via a curved region 23c which extends in a direction oriented transversely to the longitudinal direction of extension 27.

From the first portion 23a a rectangular buckle tongue 28 is stamped, which in contrast to the bent-back second portion 23b is not folded onto the first portion 23a of the body 23 but projects from the bent-back portion 23b in a longitudinal direction of extension 27, the flat buckle tongue 28 extending in the extension plane of the bent-back second portion 23b.

The bent-back second portion 23b has, therefore, two linear weakened regions 29 extending in the longitudinal direction of extension 27, which are aligned with the outer edges 29a of the buckle tongue 28 extending in the longitudinal direction of extension 27. The weakened regions 29 are, in this case, designed such that they tear in the longitudinal direction of extension 27, when a force F acts on the body 23 counter to the longitudinal direction of extension 27 which is absorbed by the buckle clasp 34 as an abutment, whereby the buckle tongue 28 is effectively extended in the longitudinal direction of extension 27.

As a result, the body 23 of the buckle element 1—relative to a state installed in a motor vehicle—is brought closer along the vertical vehicle axis z to the shoulder belt deflection element 32 and thus the shoulder belt S is relieved in the direction of extension of the belt V, which additionally limits the belt force $F_B$ acting on the shoulder belt in the vicinity of the buckle element 1.

FIG. 24 shows a schematic sectional view of a further variant of a buckle element 1 in which the mobile region B of the buckle element 1 is configured to be displaceable in a linear manner in a direction of movement 50 relative to a housing G, which encloses the mobile region B, in order to form a receiver for the mobile region B, and namely preferably transversely to said direction of movement 50.

The mobile region B is configured as a deflection body, about which the safety belt 10 is positioned in the direction of extension of the belt V for deflecting the safety belt 10 by, in particular 180°, the safety belt 10 bearing against a bearing region A of the mobile region B, which is preferably of convex configuration and opposes in the direction of movement 50 a base 51 of the housing G extending transversely to the direction of movement 50. Within the housing G extend the two belt portions S, L in the direction of movement 50, with the exception of the portion of the safety belt 10 bearing against the bearing region A.

From the base 51 in the direction of movement B projects a wall 52 surrounding the mobile region B, which defines an open top surface opposing the base 51, through which the safety belt 10 in the form of the shoulder portion S is guided into the housing G in the direction of extension of the belt V and through which said safety belt is guided in the form of the (deflected) lap portion L out of the housing G, guides being provided for the two belt portions S, L on one edge region of the open top surface, which guides respectively encompass in cross section the two portions S, L, the guide for the lap portion L being curved, so that the lap portion L is deflected in a direction oriented transversely to the direction of movement 50.

From a side of the base 51 of the housing G remote from the mobile region B, in the direction of movement 50 of the mobile region B projects a buckle tongue 28, which may be inserted into a buckle body (buckle clasp) for locking a buckle. The buckle tongue is of elongate configuration in a longitudinal direction of extension 27, which is aligned with the direction of movement 50 of the mobile region B. The buckle body is preferably designed and provided for fastening to a vehicle chassis or a vehicle seat.

The mobile region B is coupled to the base 51 of the housing G via at least one deformation element in the form of a first spring element D, as well as via a damping element 70 for damping the movement (translation) of the first spring element D (and thus the mobile region B).

If a person strapped-in by means of the safety belt 10 according to requirements, in a dangerous situation, and as a result of inertial motion due to deceleration falls into the safety belt 10, a force acts on said safety belt which tensions the safety belt 10, i.e. the shoulder portion S and the lap portion L, in the direction of extension of the belt V, a force being introduced via the bearing region A into the mobile region B, which displaces said region from an initial position located closer on the base 51 in the direction of movement B, i.e. counter to the direction of extension of the belt V of the shoulder portion S into a final position, the adjustment path of the mobile region B, the length thereof in the direction of movement 50 being determined when a predetermined force acts on the mobile region B in the direction of movement 50 by the spring constant of the first spring element D, corresponding to a relief of the shoulder portion S, which limits the resulting force acting on the shoulder portion S. By means of the damping element 70, a tendency to oscillate of the first spring element D is suppressed (for example, an aperiodic limit case).

So that only the shoulder portion S is relieved (force limitation), additionally the passage of the safety belt 10 through the buckle element 1 has to be blocked, so that the length of the lap portion L (further belt portion) remains constant. To this end, the safety belt 10 according to FIGS. 30, 31, 32 and 33 may be secured to a locking region C of the buckle element 1, the locking region C preferably being a region of the housing G of the buckle element 1. Preferably, the safety belt 10, however, alternatively to FIGS. 30-33, is secured by the mobile region B itself on the buckle element, and namely preferably before the mobile region B reaches its final position.

Figure 30:
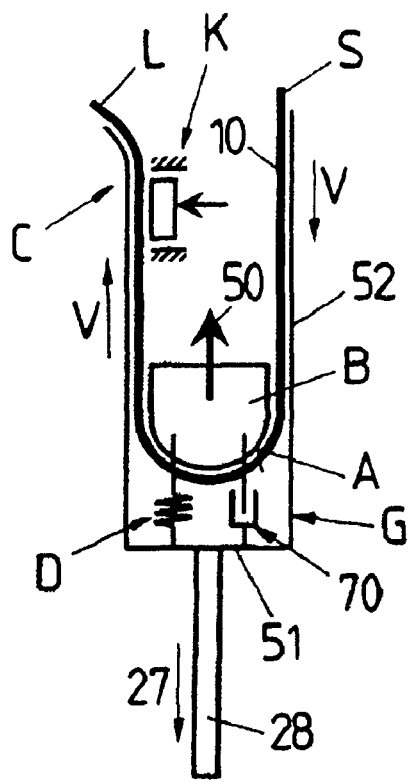
FIG. 30 shows a schematic sectional view of the buckle element shown in FIG. 24, with a displaceably mounted clamping element for locking the through-passage of the belt.

According to FIG. 30, the locking region C is configured on an inner face of the wall 52 facing the mobile region B, and namely preferably on an edge region of the wall 52 bordering the open top surface of the housing G. A clamping element K associated with the locking region C, is in this case displaceable in a direction oriented transversely to the direction of movement 50 from a first position in which the safety belt 10 may slide along the locking region C into a second position in which the clamping element K presses the safety belt 10 against the locking region C, so that the safety belt 10 is secured on the locking region C. This securing may in this case be provided such that beyond a specific force level the safety belt slips through, i.e. the safety belt slides along the locking region C. An actuation of the clamping element K takes place either separately by an additional device for generating movement or is effected by the mobile region B which may both release and drive the clamping element K.

Figure 31:
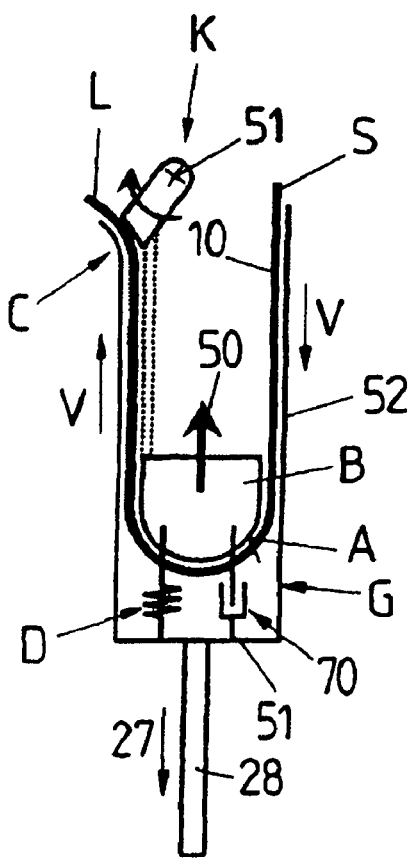
FIG. 31 shows a schematic sectional view of a modification of the buckle element shown in FIG. 30, with a clamping element pivotably mounted on the housing of the buckle element for blocking the through-passage of the belt.

Relative to the clamping element K of FIG. 30 which is displaceable in a linear manner, the clamping element K of FIG. 31 is mounted on said edge region of the housing G, pivotable to and fro between two positions, the clamping element K as disclosed above, in its second position pressing the safety belt 10 against the locking region C. In this case, with increasing deflection of the clamping element K, the clamping force introduced into the safety belt 10 on the locking region C increases. An actuation of the clamping element K may take place in the same manner as with a clamping element K (see FIG. 30) which is displaceable in a linear manner.

Figure 32:
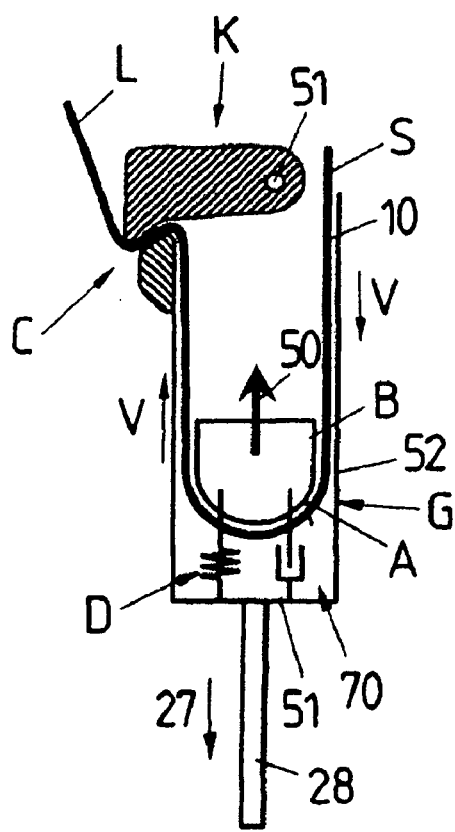
FIG. 32 shows a schematic sectional view of a modification of the buckle element shown in FIG. 31, in which the pivotable clamping element is additionally configured to deflect the safety belt.

In the buckle element 1 shown in FIG. 32, the clamping element K, in contrast to FIG. 31, is configured such that it engages behind the aforementioned edge region of the wall 52 of the housing G, which preferably projects in a direction oriented transversely to the direction of movement 50 from an outer face of the wall 52 remote from the mobile region B, in the second position in which the clamping element K presses the safety belt 10 against the locking region C for blocking the belt through-passage, with a nose projecting in the direction of movement 50 from the clamping element K, so that the safety belt 10 (lap belt L) positioned around the nose is preferably deflected by 180°.

Figure 33:
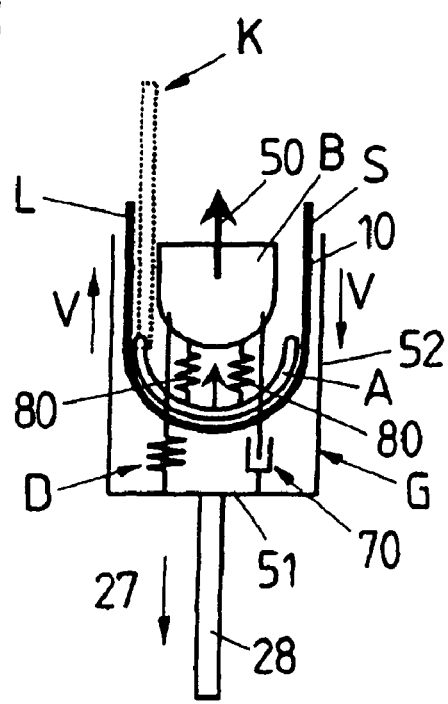
FIG. 33 shows a schematic sectional view of a further modification of the buckle element shown in FIG. 24, with a bearing region for the safety belt, which is resiliently connected to the mobile region for blocking the through-passage of the belt.

In the buckle element 1 shown in FIG. 33, the bearing region A is configured to be convex-concave in cross section and via at least one second spring element 80 connected to a convex curved side of the mobile region B facing the concave side of the bearing region A. The bearing region A is thus, relative to the mobile region B, displaceable from a first position into a second position located closer to the mobile region B, and namely by tensioning the at least one second spring element 80. This movement is effected by a safety belt 10 positioned around the bearing region A, if said safety belt is tensioned, as a result of an accident, in the direction of extension of the belt V, and exerts a force counter to the direction of extension of the belt V of the shoulder portion S onto the bearing region A. In this case, the bearing region A is moved into its second position located closer on the mobile region B, and thus presses—with the deformed (compressed) second spring element 80—the mobile region B in the final position thereof, the aforementioned deformation element D in the form of the first spring element exerting a restraining force onto the mobile region B, which pretensions the mobile region in the direction of the initial position. In this case, a spring constant of the at least one second spring element 80 which is smaller relative to the first spring element D guarantees that the bearing region A is moved into its second position, before the mobile region B is moved into the final position by the belt force acting, in the event of a crash, on the bearing region A.

Thus the bearing region A may be used as a locking switch. In other words, the bearing region A is preferably configured, when moving into its second position and/or in the second position, to trigger a movement of one of the above disclosed clamping elements K and/or to be coupled to such a clamping element K, such that the bearing region A when moving into its second position produces a movement of the clamping element K into the second position thereof.

FIG. 25 shows a schematic sectional view of a modification of the buckle element 1 shown in FIG. 24, in contrast to FIG. 24 the mobile region not being coupled to the housing G via a first spring element and/or damping element but via a sheet metal strap D.

The sheet metal strap D has a first limb 59 which projects from the mobile region B in the direction of movement 50 toward the base 51 of the housing G of the buckle element 1 and via a curved connection region 58 is connected to a second limb 57, which extends in the direction of movement 50 toward the edge region of the wall 52 and is secured there to the housing G.

With an impingement of the mobile region B by a force transmitted by the safety belt 10 in the event of a crash, the sheet metal strap is subjected to roll bending which applies a predefinable resistance against the movement of the mobile region B from its initial position in the vicinity of the base 51 into its final position in the vicinity of the open top surface of the housing G.

During the roll bending process which takes place during the movement of the mobile region B from the initial position into the final position, the curved connection region 58 travels toward the open top surface, which corresponds to an extension of the first limb 59 and a shortening of the second limb 57. As a result, the mobile region B in the final position has a relatively larger distance from the base 51 which with simultaneous securing of the safety belt 10 to the locking region C causes a corresponding relief (force limitation) of the shoulder portion S.

According to FIGS. 26 and 27 at least two such sheet metal straps D are provided which oppose one another transversely to the direction of movement 50.

FIG. 28 shows a schematic, partially sectioned plan view of a modification of the buckle element 1 shown in FIG. 25, in which the mobile region B is not coupled by means of a sheet metal strap D to the housing G of the buckle element 1 in order to apply a predefinable resistance against the movement from the initial position into the final position, but by means of two deformation elements D, D' in the form of pins, in particular made of a metal, which with one respective first portion 55 which extends transversely to the direction of movement 50, are inserted into one respective blind hole-shaped recess 60, 61 of the mobile region B and are respectively secured to the base 51 of the housing G via a second portion 56 extending in the direction of movement 50 which is connected to the respective first portion 55. In this case, the two recesses 60, 61 are configured on opposing sides of the mobile region B, which respectively face the wall 52 and in particular extend parallel to one another.

When subjecting the mobile region B to a force transmitted by the safety belt 10, which acts in the direction of movement 50 on the mobile region B, the mobile region B is moved, by withdrawing the first portions 55 of the two pins D, D" from the recesses 60, 61, from its initial position in the vicinity of the base 51 into its final position in the vicinity of the open top surface of the housing G. In this connection, the withdrawn regions of the first portions 55 of the two pins D, D" are respectively bent back, so that they are respectively aligned with the second portion 56 and effectively extend said second portion. Thus a predefinable resistance is applied against the movement of the mobile region B into the final position, via which the achievable force limitation of the force acting on the shoulder portion in the event of a crash may be adjusted. A securing of the safety belt 10 on a locking region C of the housing G may take place according to the already disclosed and/or subsequent measures.

FIG. 29 shows a modification of the principle shown in FIG. 28. In this case, in contrast to FIG. 28 the mobile region B is not mounted via two deformable pins D, D' on the housing G, but via a deformation element D in the form of a continuous loop, which in particular consists of a metal, which is connected to the base 51 of the housing G via two free end portions 59 which, proceeding from the base 51, extend in the direction of movement 50 to the mobile region B, where they are inserted into one respective recess of the mobile region B, which are respectively defined by two pins 65a, 65b arranged offset to one another. These pins 65a, 65b are arranged offset to one another transversely to the direction of movement 50 such that the loop D tapers in the direction of movement B. By the double deflection on both sides, the pins 65a, 65b deform the loop D when the mobile region B moves into the final position, which applies a predefinable resistance against said movement, via which the force limitation of the force acting on the shoulder portion S in the event of a crash may be adjusted. A securing of the safety belt 10 to a locking region C of the buckle element 1 may take place according to the already disclosed measures.

Figure 34:
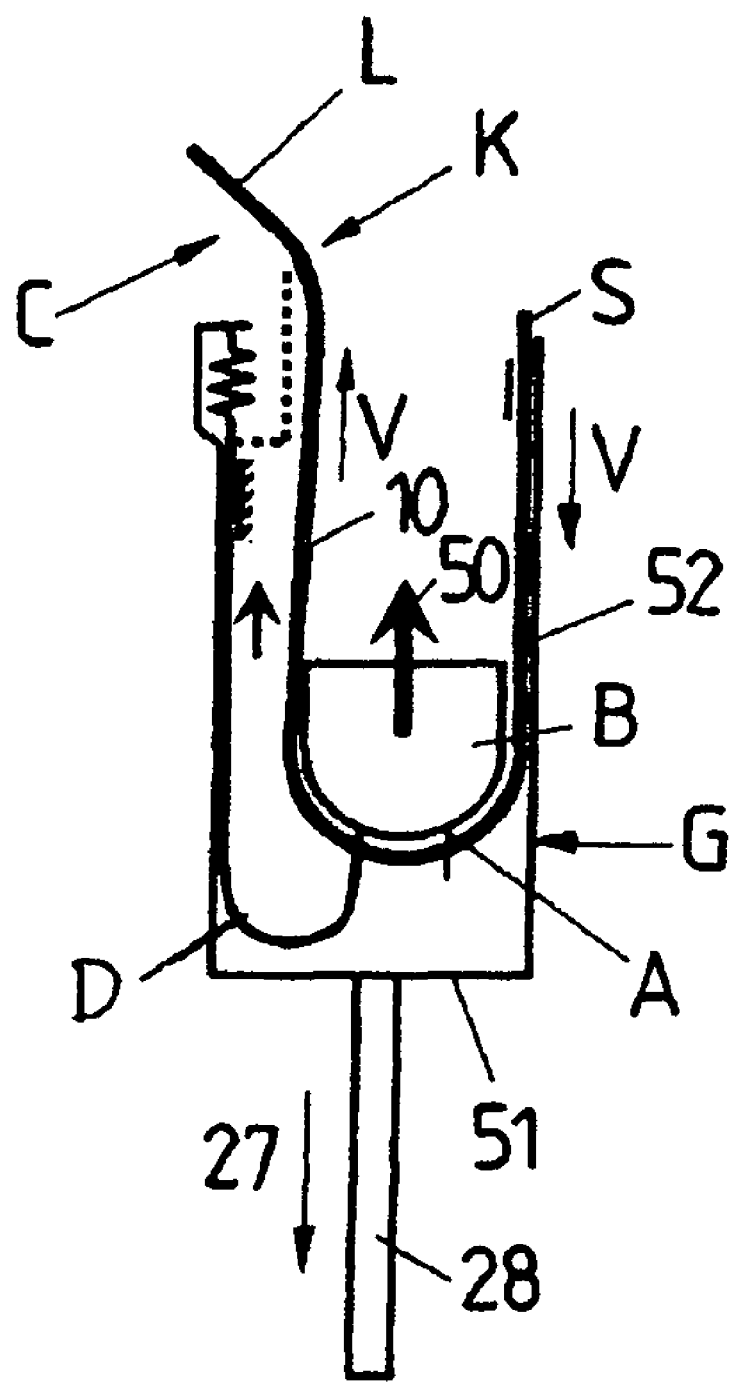
FIG. 34 shows a schematic sectional view of a modification of the buckle element shown in FIG. 25, in which the sheet metal strap is mounted in a linear displaceable manner on the housing of the buckle element additionally for blocking the through-passage of the belt.

According to FIG. 34, the sheet metal strap D with a buckle element 1 of the type shown in FIG. 25 is additionally mounted displaceably on the housing G in a direction of movement 50 of the mobile region B, to and fro between a first and a second position (in a linear manner). As this degree of freedom of the sheet metal strap D is designed to apply a lower resistance to a belt force acting on the bearing region A in the direction of movement 50 (and/or counter to the direction of extension of the belt V of the shoulder portion S), than the deformation (roll bending) of the deformation element D, the linear displacement of the deformation element D takes place in the second position thereof, in principle, before a deformation of the deformation element D. Thus a locking of the safety belt 10 on the locking region C is possible via the linear displacement of the deformation element D, before the deformation region is subjected to said roll bending. The securing of the safety belt 10 to the locking region may in this case be effected directly by the deformation element D, namely by said deformation element pressing the safety belt 10 in its second position against the locking region C. For restoring the deformation element D located in its second position, said deformation element is preferably coupled to the housing G via a spring means. Preferably the deformation element is integrally connected to the mobile region B (in particular molded-on) so that the mobile region B itself presses the safety belt 10 against the locking region C.

In the above disclosed buckle elements 1 the housing G may fully enclose the mobile region except for slots for the safety belt 10 (guides). In this case, the open top surface of the housing G is concealed, i.e. configured as a closed top surface and/or wall.

The invention claimed is:

1. A safety belt system for a motor vehicle, comprising:
    a safety belt extending in a direction of extension of the belt,
    a shoulder portion of the safety belt for bearing against an upper body of a person strapped-in according to requirements by means of the safety belt,
    a buckle element which subdivides the safety belt into the shoulder portion and a further belt portion, the buckle element deflecting the safety belt in the direction of extension of the belt such that the two portions extend away in different spatial directions from the buckle element,
    a mobile region of the buckle element, which under the action of forces caused by a crash is mobile from an initial position in which the safety belt may slide along the buckle element into a final position, in which the safety belt is fixed to the buckle element, the mobile region being designed and provided to fix the safety belt before reaching the final position on the buckle element, and
    the safety belt cooperating with the mobile region, such that the mobile region is movable by a force acting on the shoulder portion which tensions the shoulder portion in the direction of extension of the belt, from its initial position into its final position and in that by the movement of the mobile region into the final position the shoulder portion is relieved such that the resulting force acting on the shoulder portion is limited, wherein the fixing of the safety belt on the buckle element is carried out by the mobile region itself, and wherein the mobile region is connected to a part of the buckle element via at least one deformation element when the mobile region has moved out of its initial position.

2. The safety belt system as claimed in claim 1, wherein the mobile region is configured to press against the buckle element in its final position, interposing the safety belt, in order to fix the safety belt to the buckle element.

3. The safety belt system as claimed in claim 1, wherein that the mobile region is configured in one piece.

4. The safety belt system as claimed in claim 1, wherein for fixing the safety belt to the buckle element the mobile region exerts a force on the safety belt in a direction which faces the final position of the mobile region.

5. The safety belt system as claimed in claim 1, wherein by the movement of the mobile region into the final position only the shoulder portion is relieved, in order to limit the force introduced into the shoulder portion.

6. The safety belt system as claimed in claim 1, wherein the mobile region is configured to bear in the initial position with a bearing region against the shoulder portion such that the force introduced into the one shoulder portion for moving the mobile region may be transmitted thereto.

7. The safety belt system as claimed in claim 6, wherein the mobile region is configured to displace the bearing region when moving into the final position at least partially counter to the direction of extension of the belt of the shoulder portion such that the shoulder portion bearing against the bearing region is relieved.

8. The safety belt system as claimed in claim 6, wherein the bearing region may be coupled to the mobile region, which is movable to and fro between a first and a second position, such that the bearing region, by the action of a force acting on the shoulder portion which tensions the shoulder portion in the direction of extension of the belt, is moved from the first position into the second position before the mobile region is moved by said force into its final position.

9. The safety belt system as claimed in claim 1, wherein the buckle element has at least one through-opening for guiding the safety belt and in particular for deflecting the safety belt, the safety belt being able to pass through the at least one through-opening in the initial position of the mobile region in the direction of extension of the belt.

10. The safety belt system as claimed in claim 9, wherein the locking region is formed by an edge region of the buckle element defining the through-opening.

11. The safety belt system as claimed in claim 1, wherein the buckle element has a locking region.

12. The safety belt system as claimed in claim 11, wherein the safety belt is secured in the final position of the mobile region at the locking region.

13. The safety belt system as claimed in claim 11, wherein the mobile region is configured to secure the safety belt when moving into the final position at the locking region.

14. The safety belt system as claimed in claim 11, wherein the mobile region and/or the locking region cooperate with the safety belt, such that the safety belt secured to the locking region carries out a relative movement counter to the direction of extension of the belt, if a force acting on the safety belt counter to the direction of extension of the belt exceeds a predeterminable force level.

15. The safety belt system as claimed in claim 1, wherein the movement of the mobile region from the initial position into the final position consists of a deformation of the mobile region.

16. The safety belt system as claimed in claim 1, wherein the mobile region is configured to be deformable such that it may be deformed by a force acting on the shoulder portion which tensions the shoulder portion in the direction of extension of the belt, in a reproducible manner from the initial position into the final position.

17. The safety belt system as claimed in claim 16, wherein the deformation is a plastic deformation.

18. The safety belt system as claimed in claim 1, wherein the at least one deformation element is configured to be deformed in a reproducible manner by the action of a predeterminable force acting on the shoulder portion which tensions the shoulder portion in the direction of extension of the belt, so that the mobile region is moved from the initial position into the final position.

* * * * *